(12) United States Patent
Jung et al.

(10) Patent No.: US 12,457,417 B2
(45) Date of Patent: Oct. 28, 2025

(54) LENS DRIVING DEVICE AND CAMERA MODULE COMPRISING SAME

(71) Applicant: LG INNOTEK CO., LTD., Seoul (KR)

(72) Inventors: Sung Ki Jung, Seoul (KR); Yun Sang Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 178 days.

(21) Appl. No.: 18/274,063

(22) PCT Filed: Jan. 28, 2022

(86) PCT No.: PCT/KR2022/001638
§ 371 (c)(1),
(2) Date: Jul. 25, 2023

(87) PCT Pub. No.: WO2022/164274
PCT Pub. Date: Aug. 4, 2022

(65) Prior Publication Data
US 2024/0430569 A1    Dec. 26, 2024

(30) Foreign Application Priority Data

Jan. 29, 2021 (KR) .......................... 10-2021-0012961

(51) Int. Cl.
*H04N 23/68* (2023.01)
*G03B 30/00* (2021.01)
(Continued)

(52) U.S. Cl.
CPC ........... *H04N 23/687* (2023.01); *G03B 30/00* (2021.01); *H04N 23/54* (2023.01); *H04N 23/55* (2023.01)

(58) Field of Classification Search
CPC ...... H04N 23/687; H04N 23/54; H04N 23/55; H04N 23/51; G03B 30/00;
(Continued)

(56) References Cited

U.S. PATENT DOCUMENTS 9,423,631 B2    8/2016  Cho et al.
9,578,244 B2    2/2017  Cho et al.
(Continued)

FOREIGN PATENT DOCUMENTS

EP        2916153         9/2015
KR   10-2012-0110436     10/2012
(Continued)

OTHER PUBLICATIONS

International Search Report dated May 23, 2022 issued in Application No. PCT/KR2022/001638.
(Continued)

*Primary Examiner* — Abdelaaziz Tissire
(74) *Attorney, Agent, or Firm* — KED & ASSOCIATES, LLP

(57) ABSTRACT

The embodiment relates to a lens driving device and a camera module including the same. A lens driving device according to an embodiment can include a first housing in which a bobbin including a lens is disposed and a magnet is disposed; a second housing disposed to surround the first housing and having a coil disposed thereon; a main substrate disposed below the second housing, a sensor substrate located between the main substrate and the second housing and having an image sensor disposed thereon, and a wiring substrate electrically connecting the main substrate and the sensor substrate.

20 Claims, 23 Drawing Sheets

(51) Int. Cl.
*H04N 23/54* (2023.01)
*H04N 23/55* (2023.01)

(58) Field of Classification Search
CPC .... G03B 2205/0023; G03B 2205/0038; G03B 3/10; G03B 2205/0046; G03B 2205/0069; G03B 5/00; G03B 17/12; G03B 2205/0007; G03B 2217/007

See application file for complete search history.

(56) References Cited

U.S. PATENT DOCUMENTS

| | | | |
|---|---|---|---|
| 9,726,852 B2 | 8/2017 | Cho et al. | |
| 9,885,849 B2 | 2/2018 | Cho et al. | |
| 10,451,836 B2 | 10/2019 | Cho et al. | |
| 10,620,396 B2 | 4/2020 | Cho et al. | |
| 11,131,831 B2 | 9/2021 | Cho et al. | |
| 11,782,234 B2 | 10/2023 | Cho et al. | |
| 11,979,652 B2 | 5/2024 | Paik et al. | |
| 12,167,133 B2* | 12/2024 | Song ..................... | H04N 23/51 |
| 12,174,450 B2 | 12/2024 | Cho et al. | |
| 2013/0258506 A1 | 10/2013 | Lee | |
| 2015/0253583 A1* | 9/2015 | Cho ..................... | H04N 23/685 |
| | | | 359/557 |
| 2016/0337591 A1 | 11/2016 | Cho et al. | |
| 2017/0052342 A1 | 2/2017 | Shin et al. | |
| 2017/0123182 A1 | 5/2017 | Cho et al. | |
| 2017/0299844 A1 | 10/2017 | Cho et al. | |
| 2018/0136436 A1 | 5/2018 | Cho et al. | |
| 2020/0012071 A1 | 1/2020 | Cho et al. | |
| 2020/0050084 A1 | 2/2020 | Lim et al. | |
| 2020/0218032 A1 | 7/2020 | Cho et al. | |
| 2021/0364733 A1 | 11/2021 | Lee et al. | |
| 2021/0396951 A1 | 12/2021 | Cho et al. | |
| 2022/0086317 A1 | 3/2022 | Paik et al. | |
| 2022/0102417 A1* | 3/2022 | Park ..................... | H10F 39/811 |
| 2022/0221734 A1* | 7/2022 | Kim ..................... | H04N 23/687 |
| 2024/0004159 A1 | 1/2024 | Cho et al. | |
| 2024/0251149 A1 | 7/2024 | Paik et al. | |

FOREIGN PATENT DOCUMENTS

| | | | |
|---|---|---|---|
| KR | 10-2017-0021610 | 2/2017 | |
| KR | 10-2018-0097012 | 8/2018 | |
| KR | 10-2020-0051998 | 5/2020 | |
| KR | 10-2020-0097086 | 8/2020 | |
| KR | 20200097086 A * | 8/2020 | |
| WO | WO 2020/145650 | 7/2020 | |
| WO | WO 2020/180078 | 9/2020 | |
| WO | WO-2020242202 A1 * | 12/2020 | ........... G02B 27/646 |

OTHER PUBLICATIONS

European Search Report dated Nov. 11, 2024 issued in Application No. 22746300.7.

* cited by examiner

[FIG. 1A]
1000
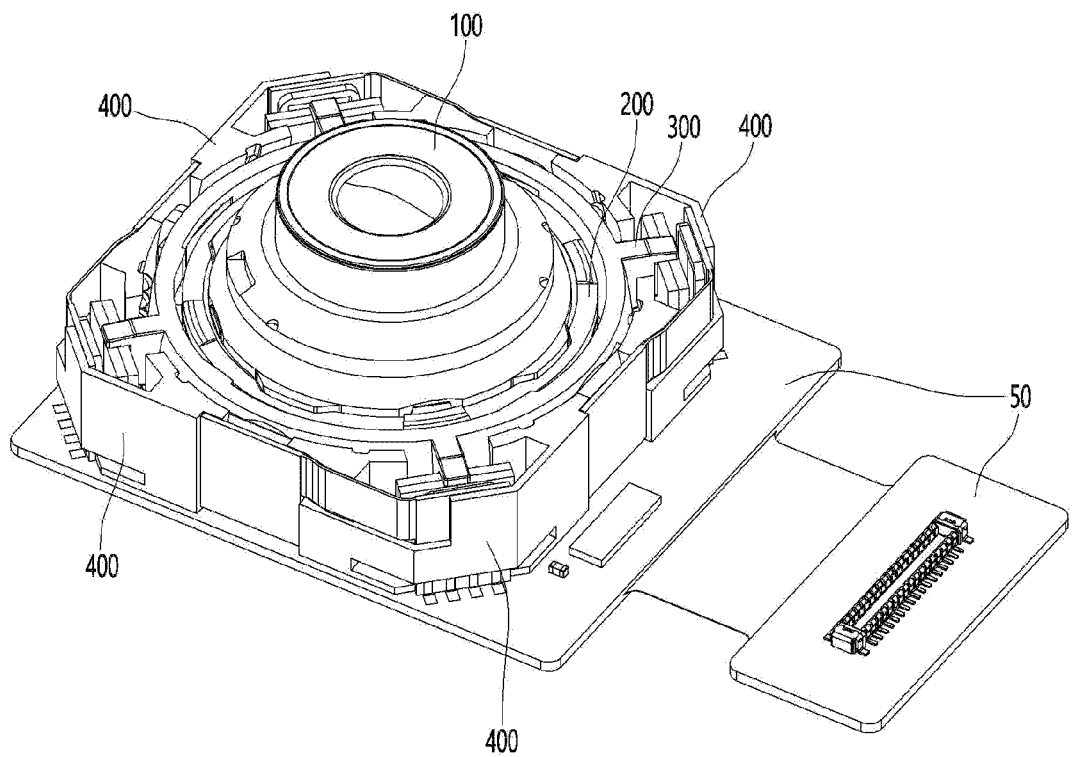

[FIG. 1B]
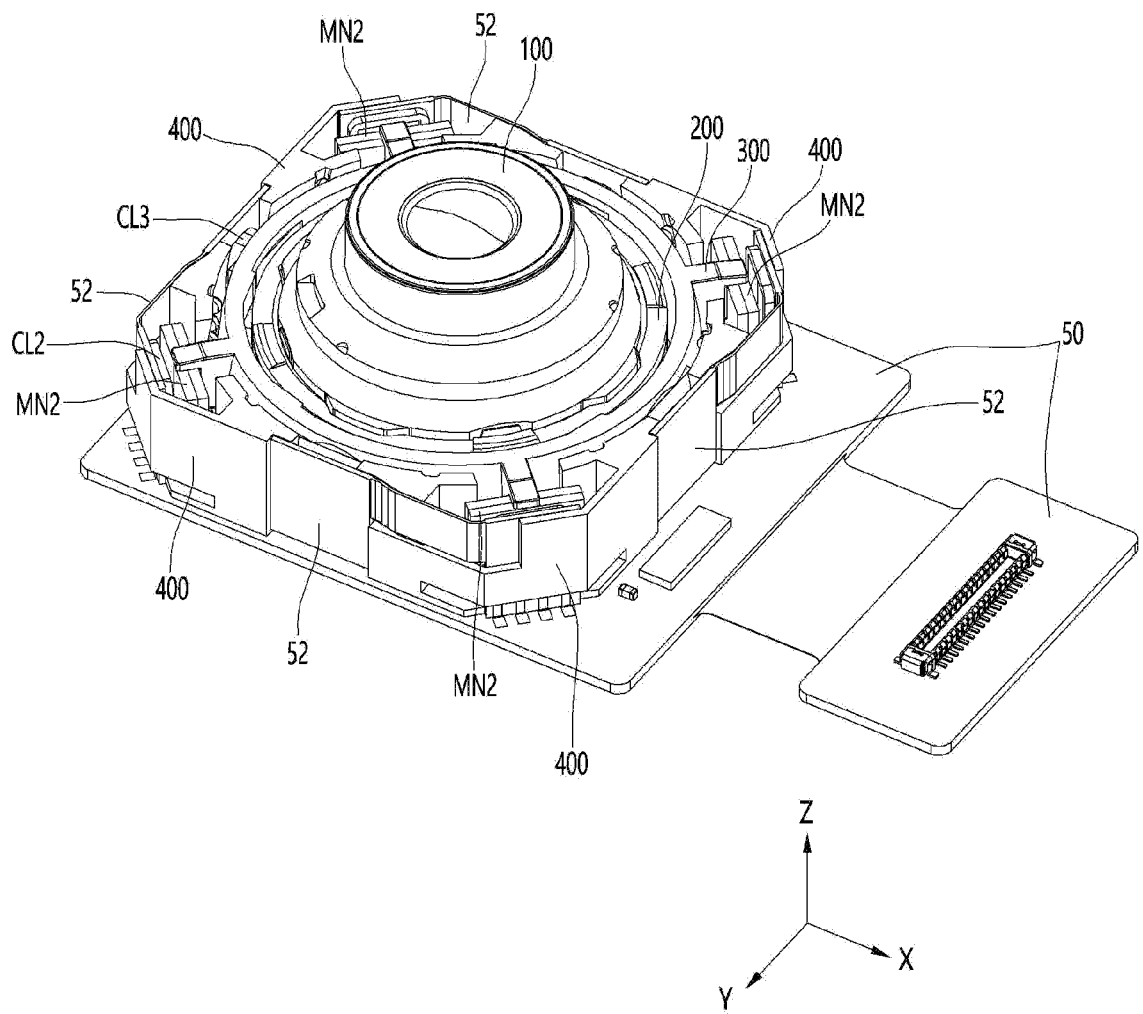

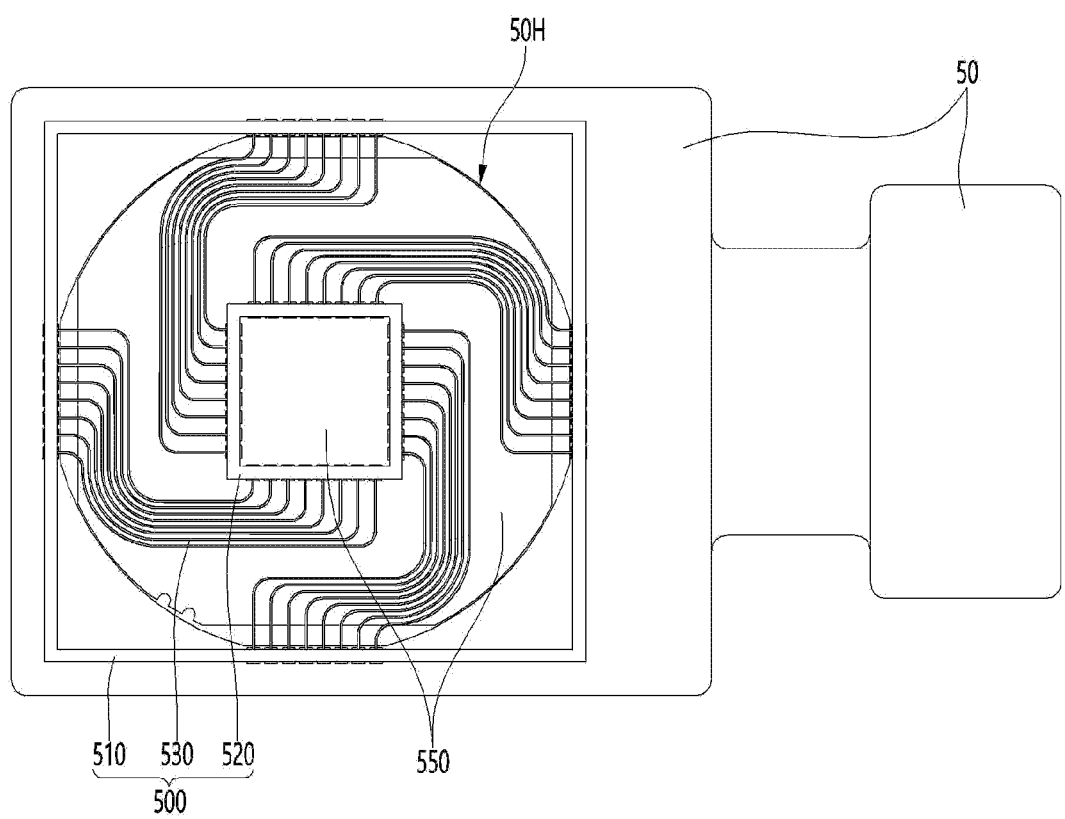
[FIG. 2A]

[FIG. 2B]
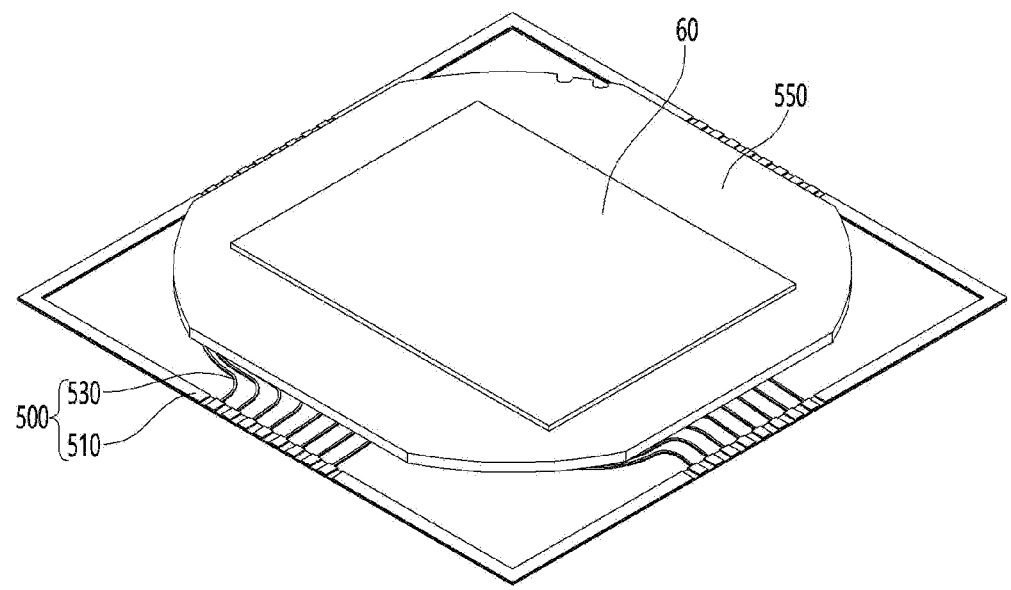

[FIG. 2C]
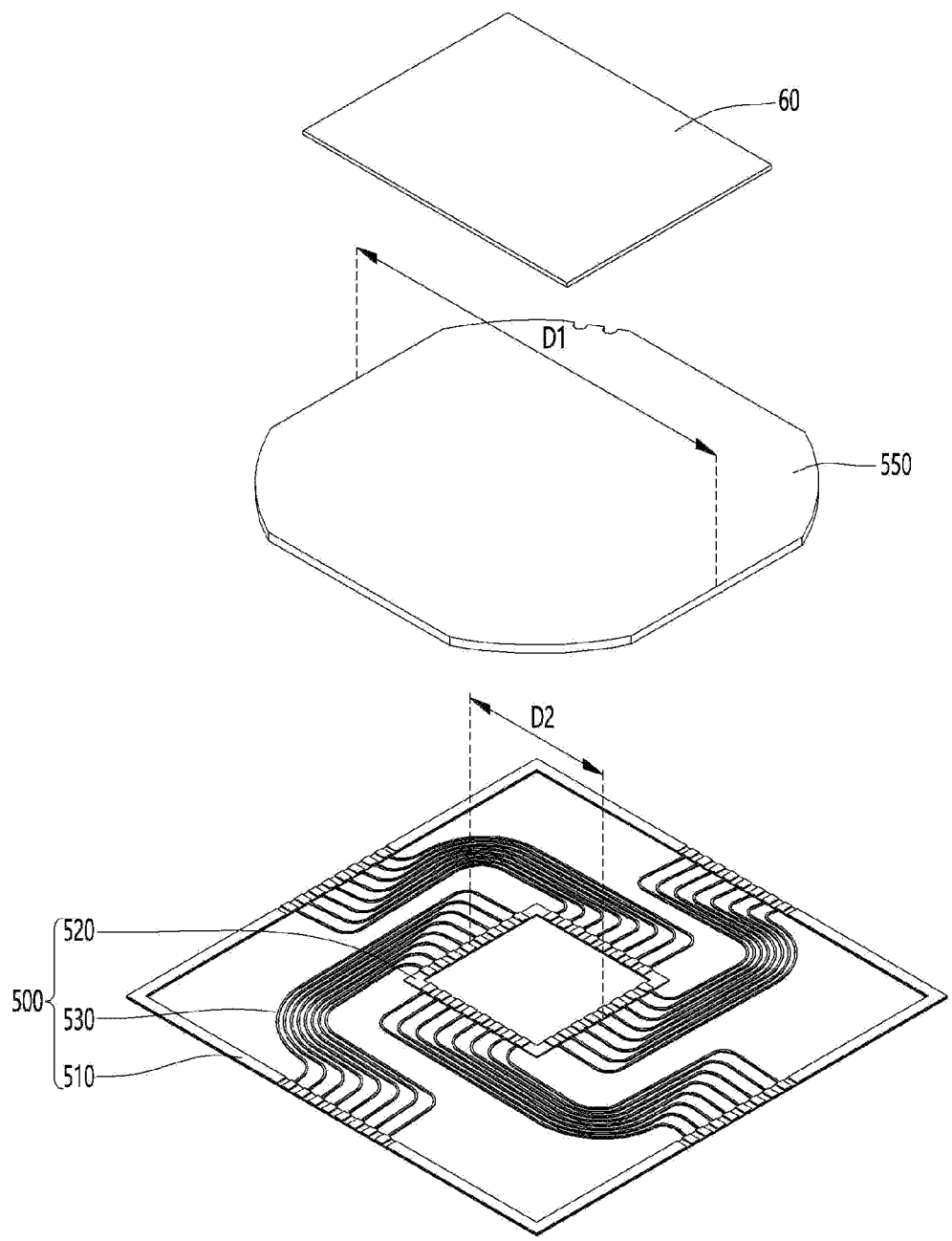

[FIG. 2D]
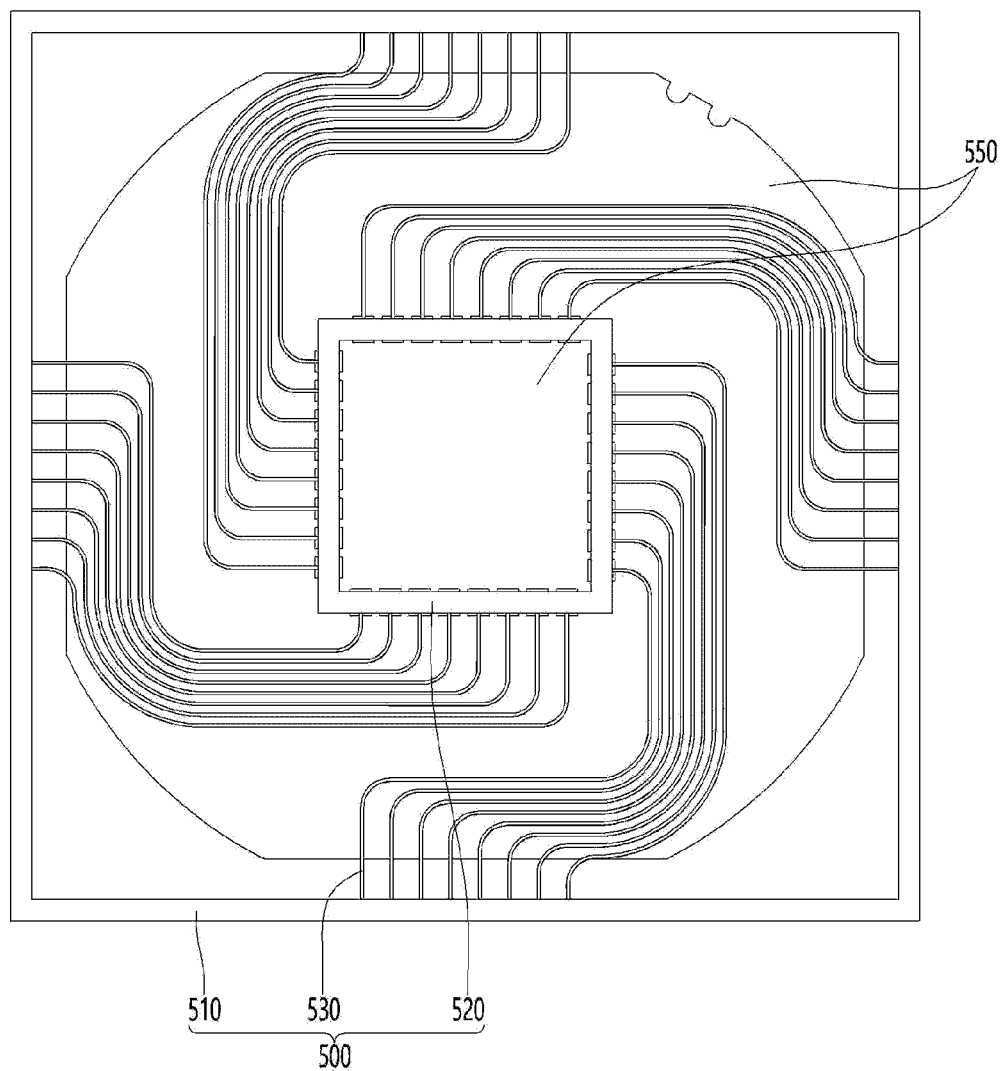

[FIG. 3A]
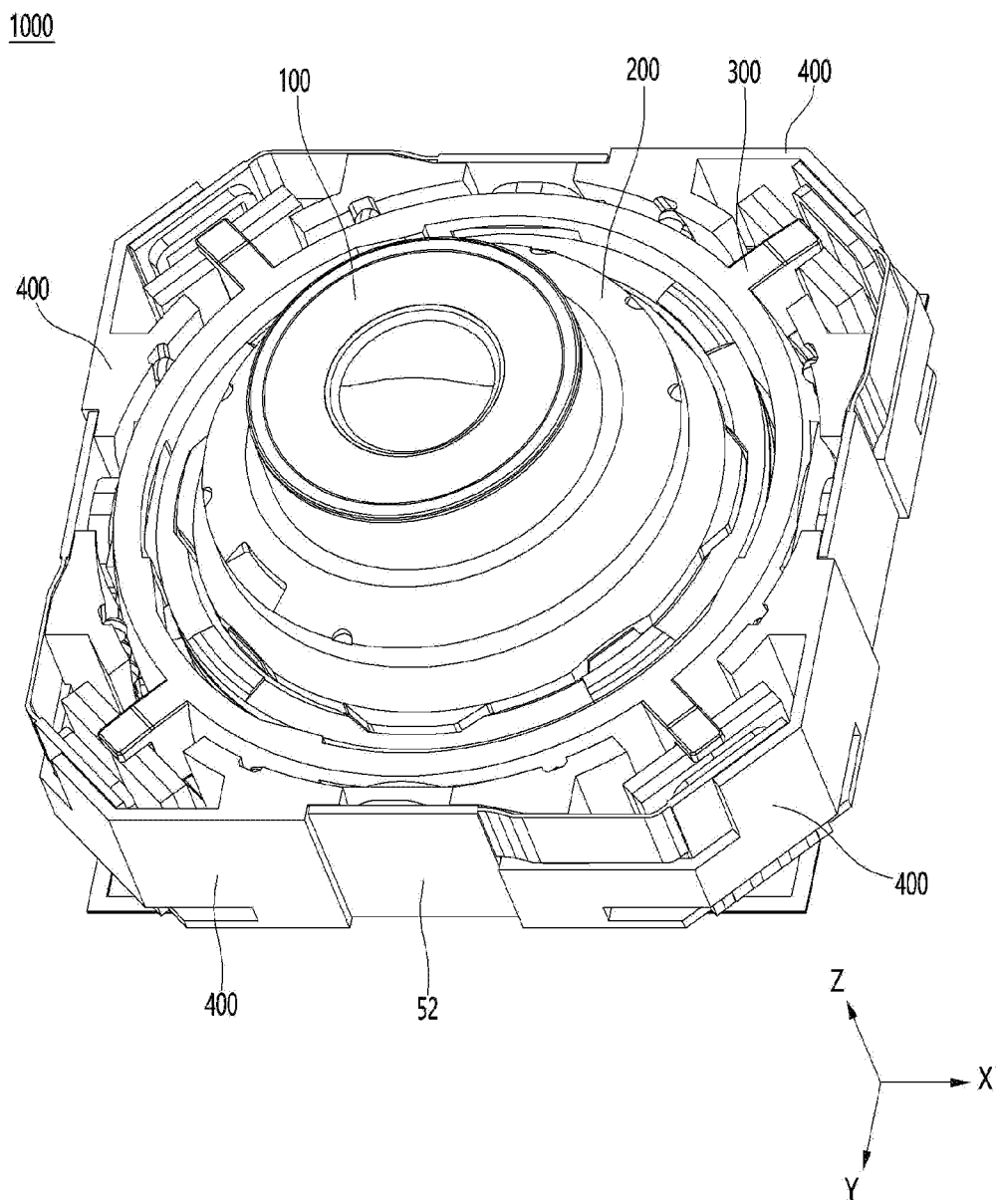

[FIG. 3B]
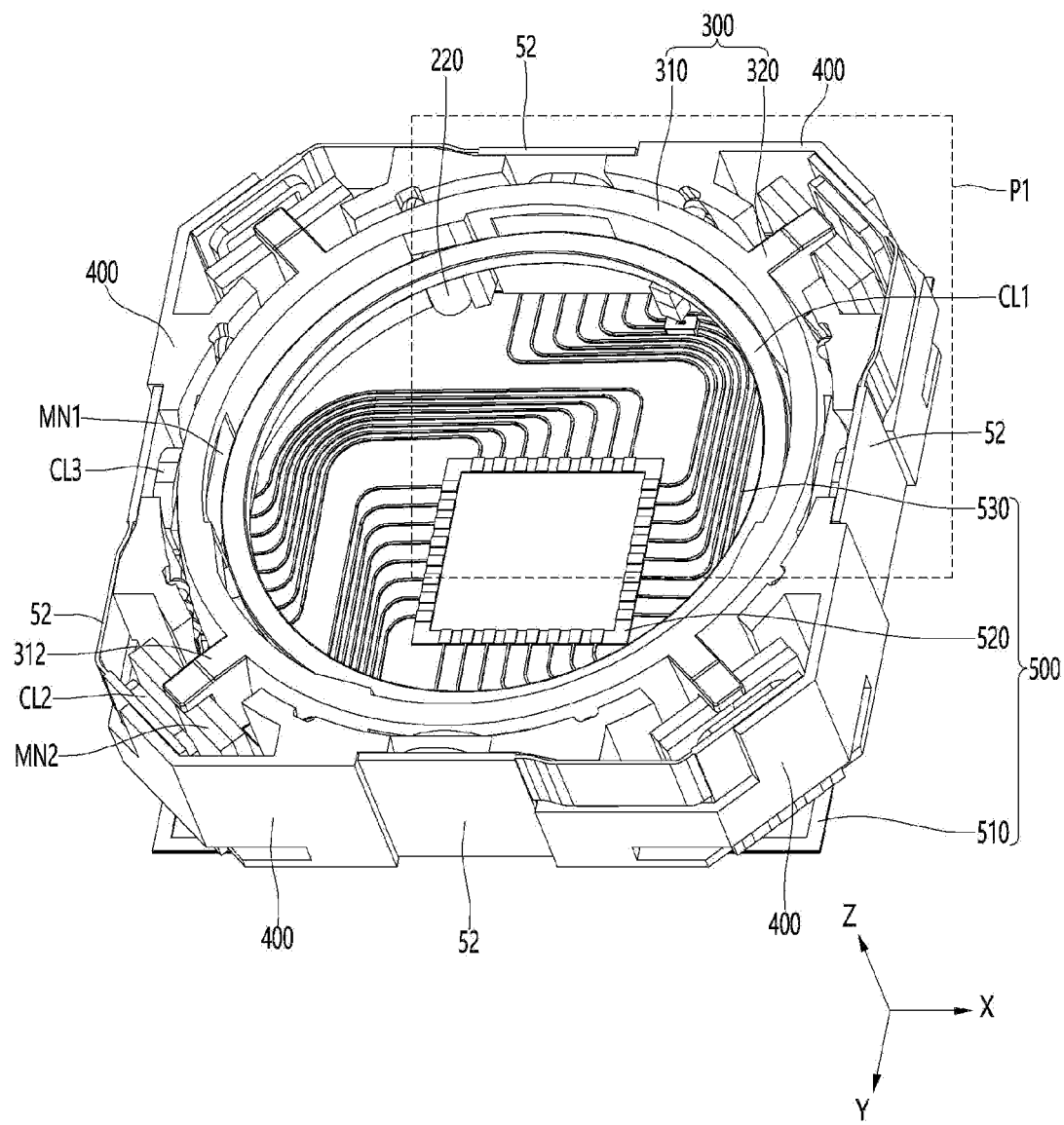

[FIG. 3C]
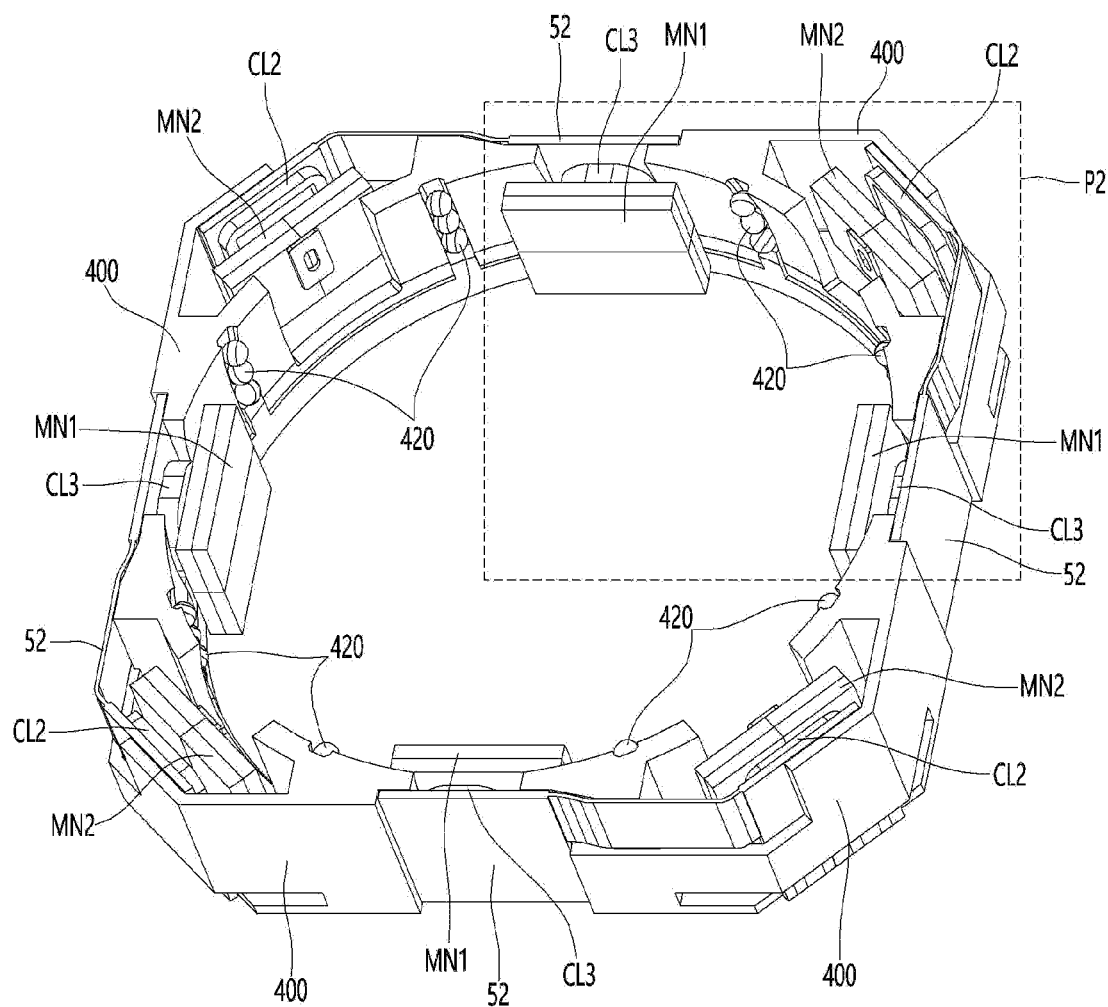

[FIG. 3D]
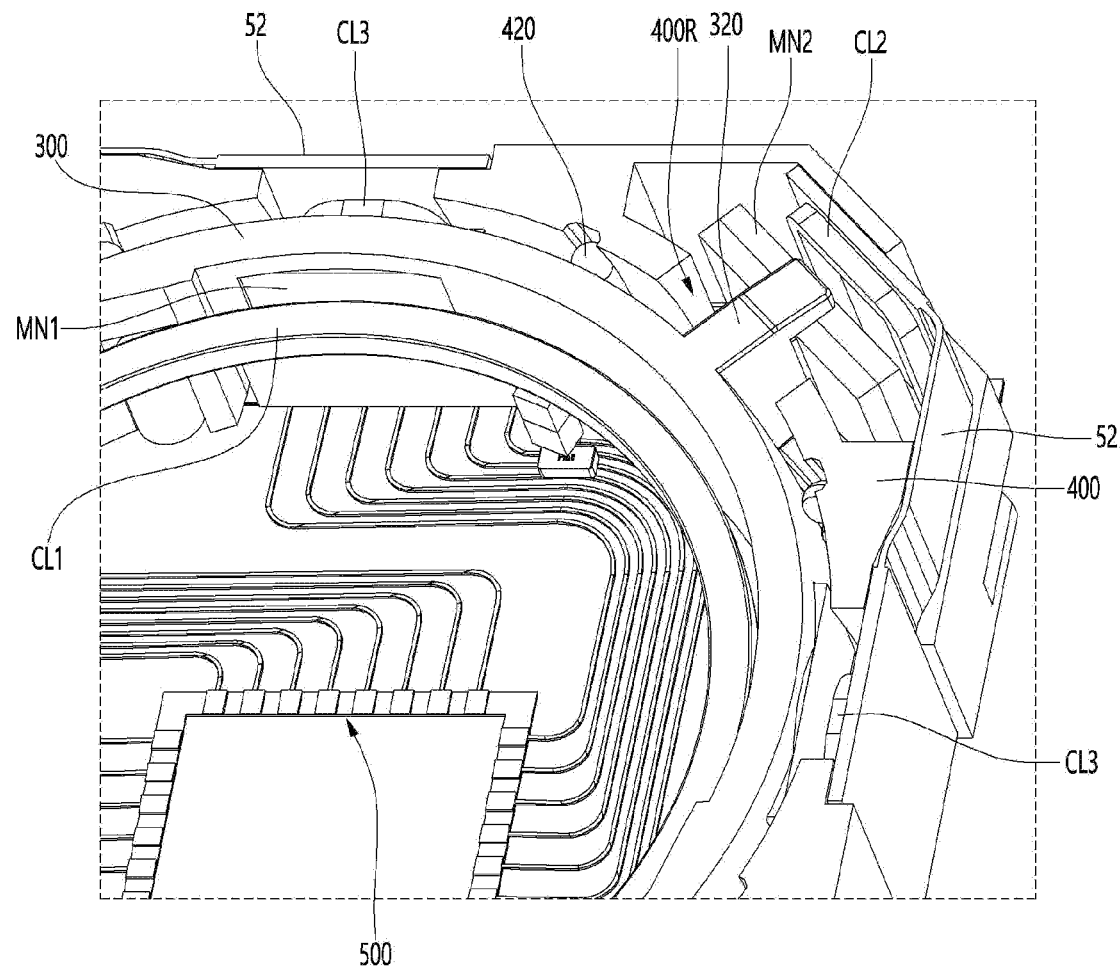

[FIG. 3E]
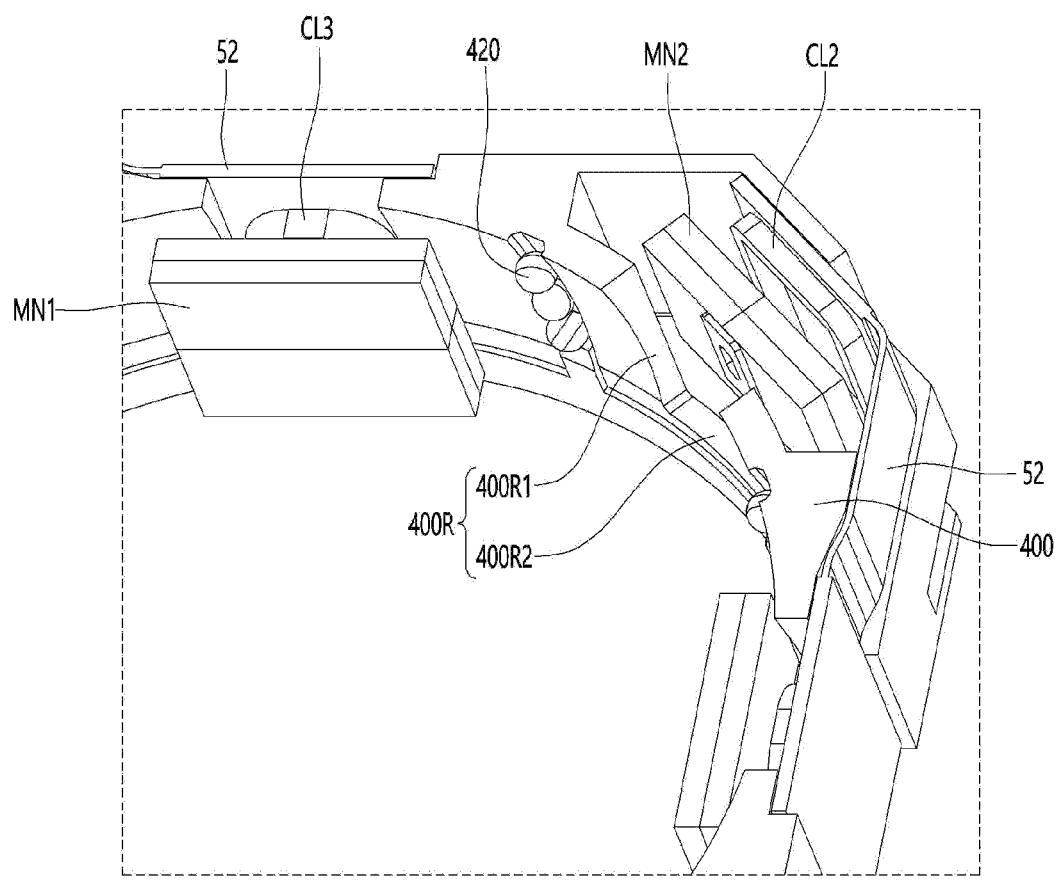

[FIG. 3F]
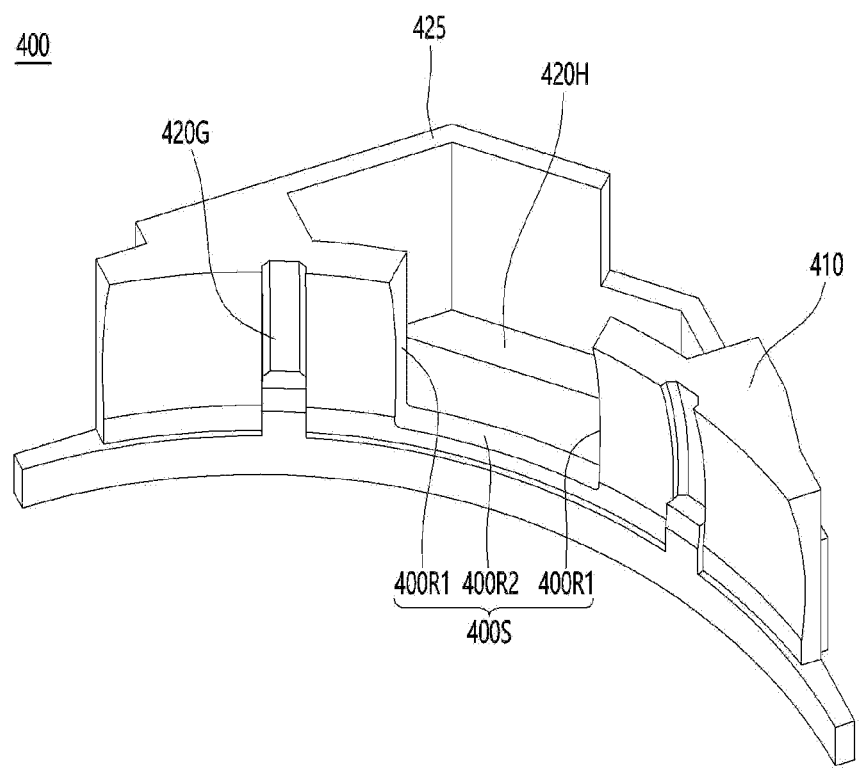

[FIG. 4A]
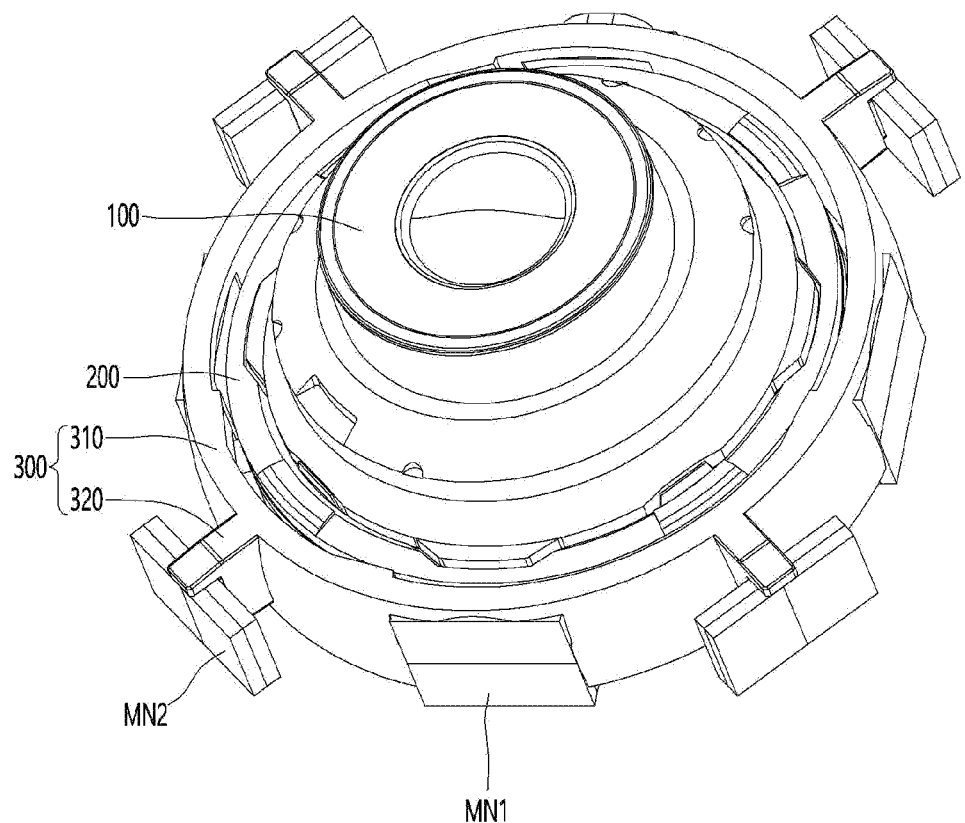

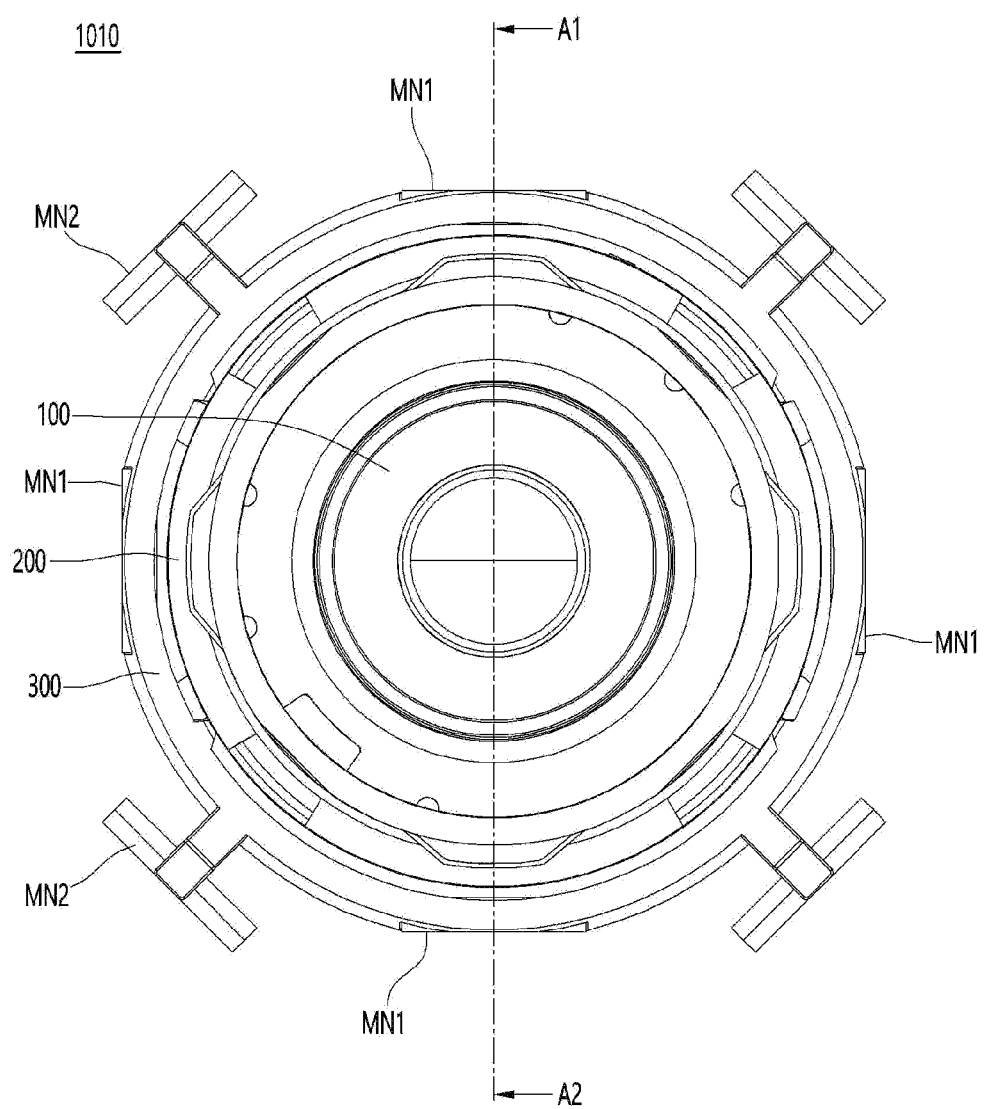
[FIG. 4B]

[FIG. 4C]
1010
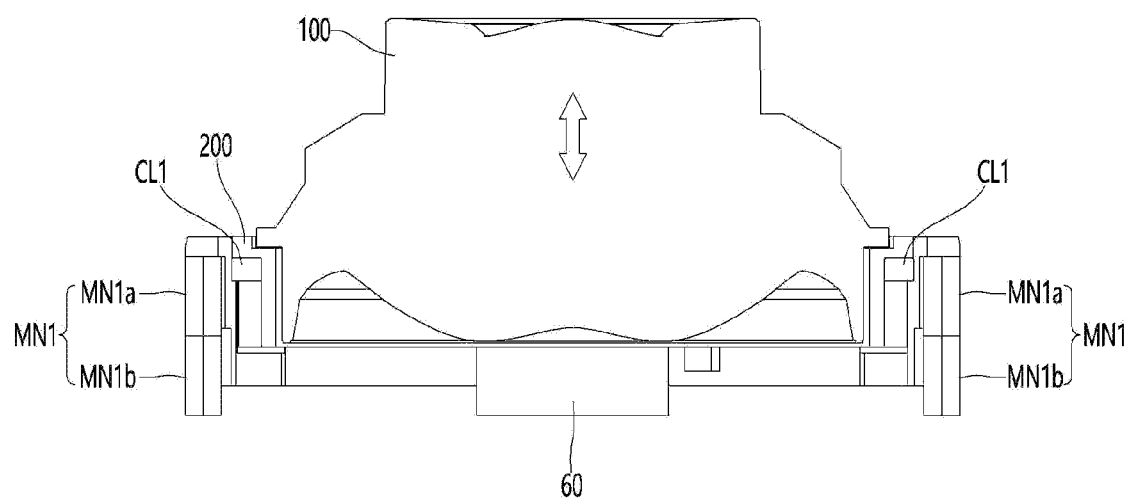

[FIG. 5A]
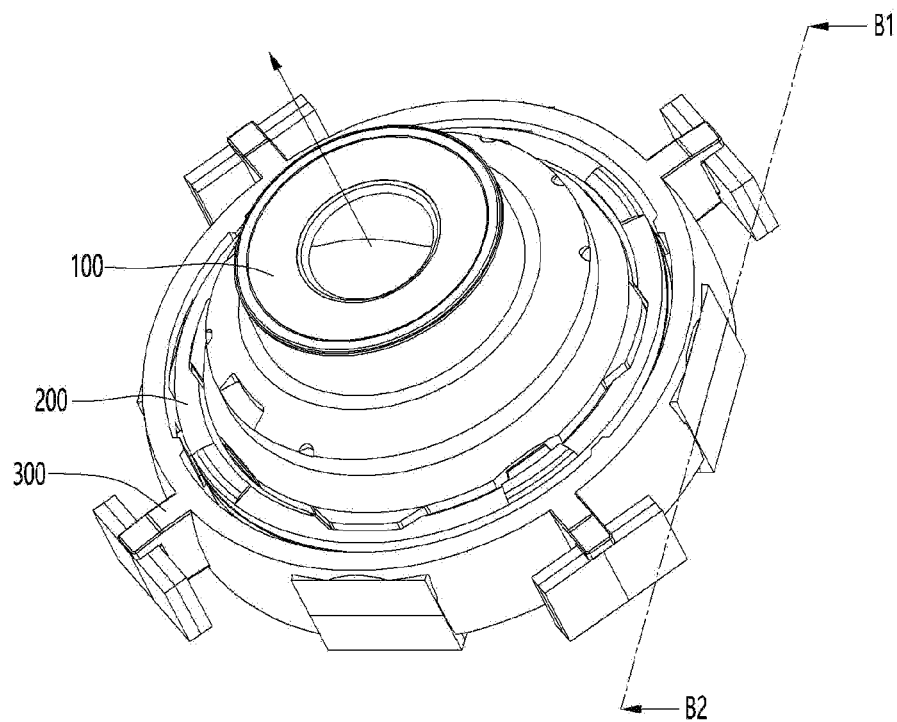

[FIG. 5B]
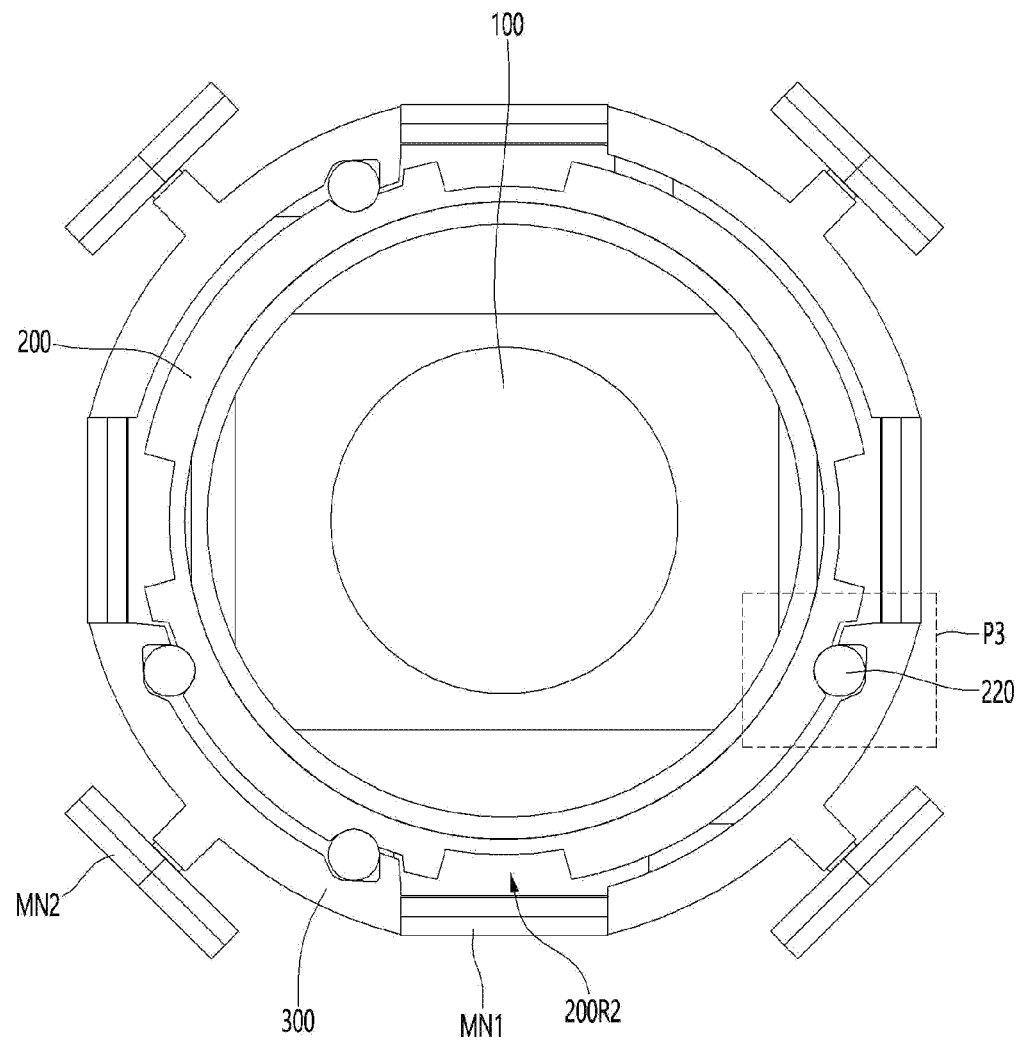

[FIG. 6A]
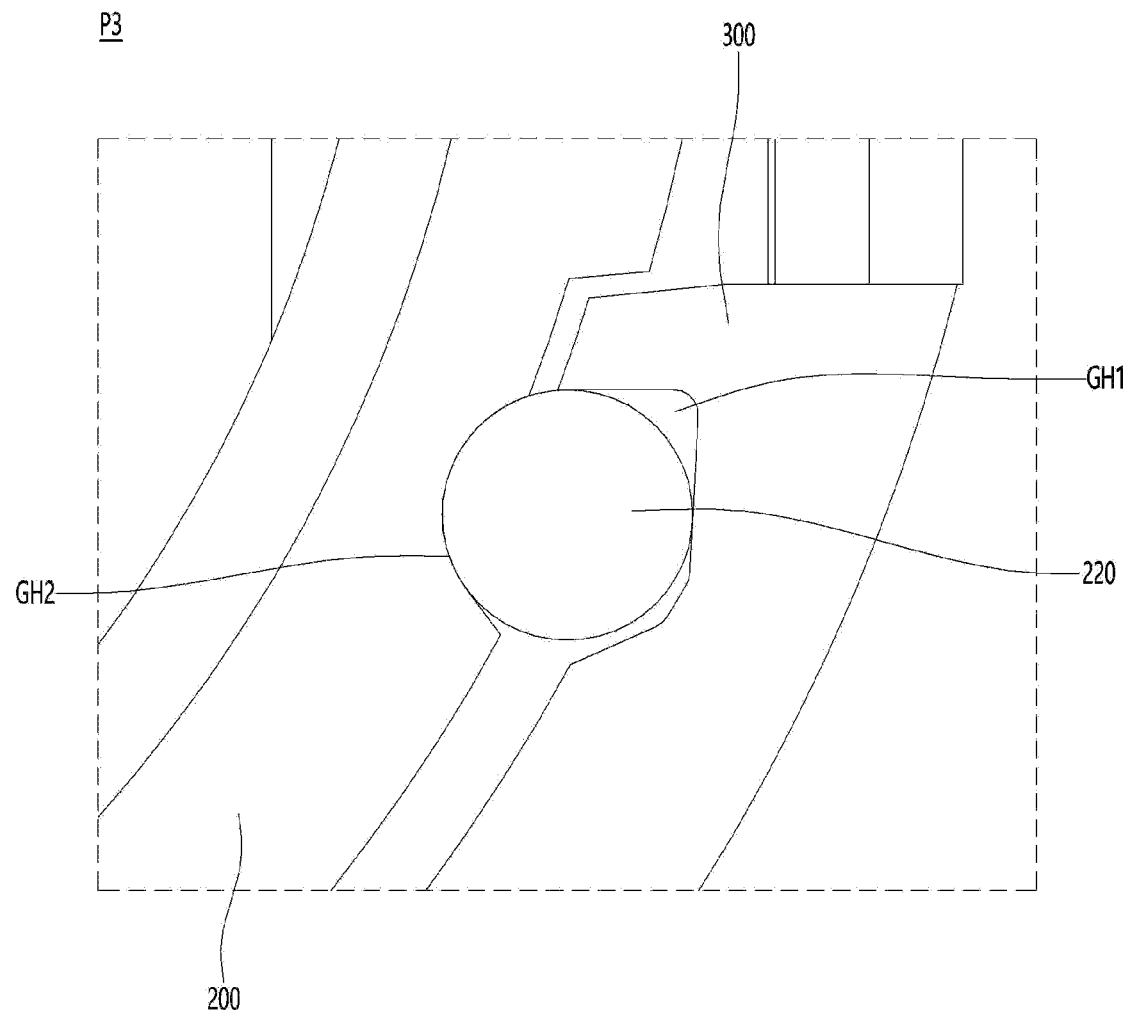

[FIG. 6B]
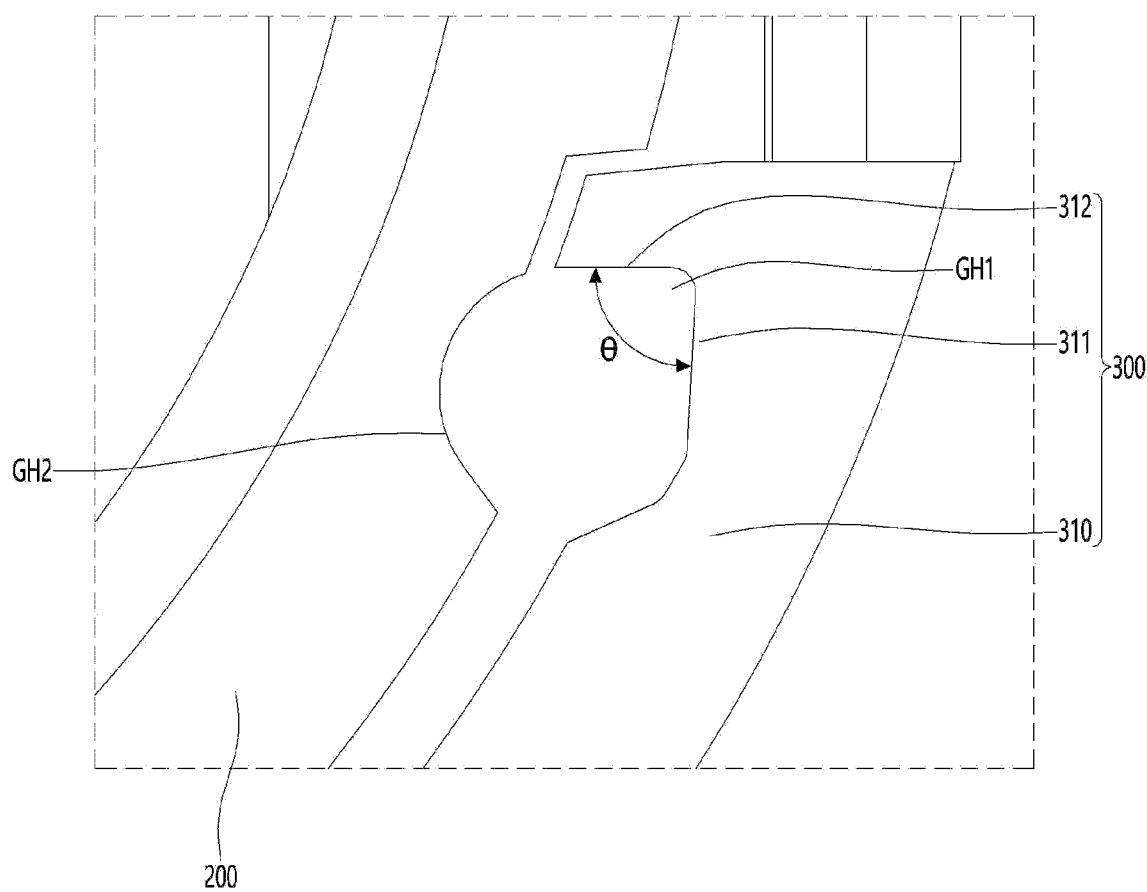

[FIG. 6C]
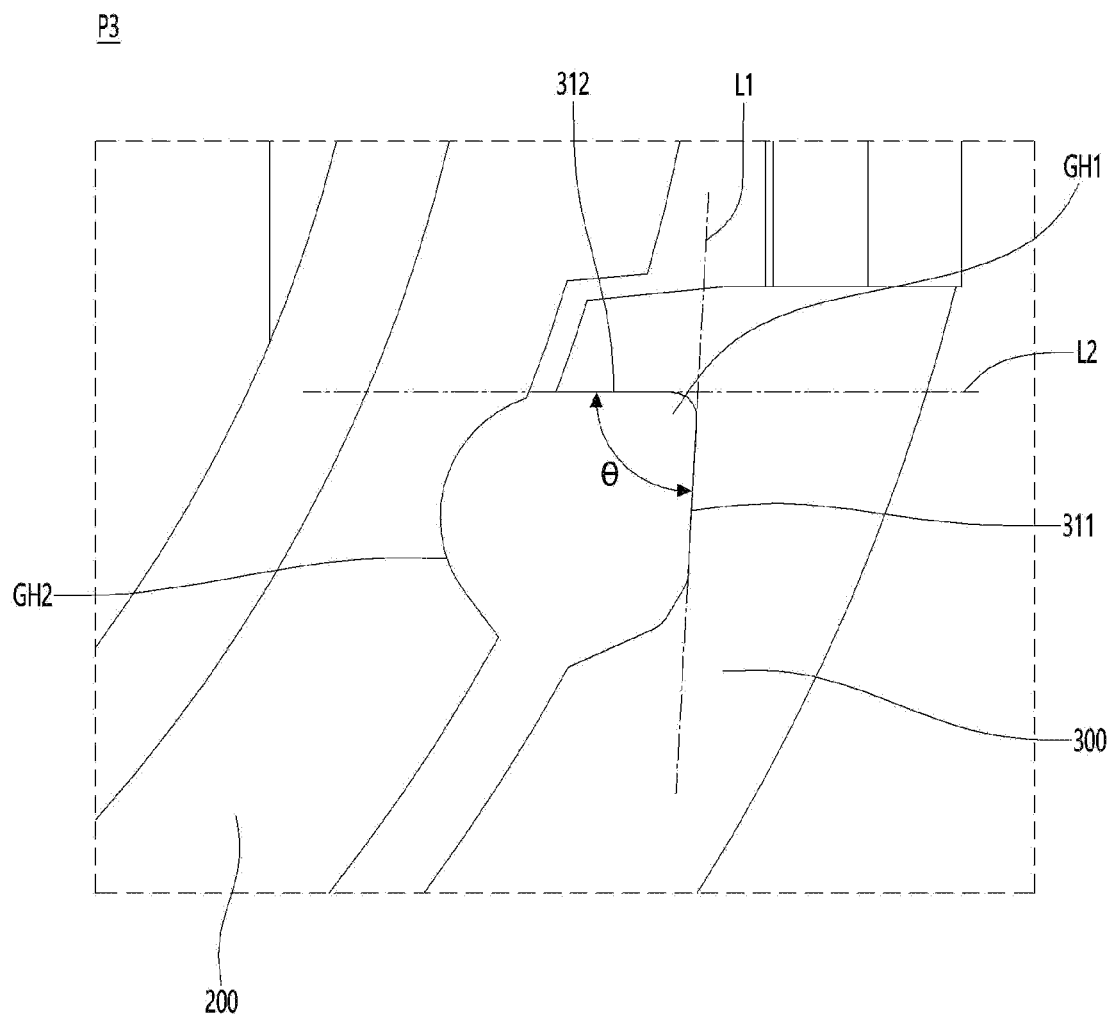

[FIG. 6D]
P3
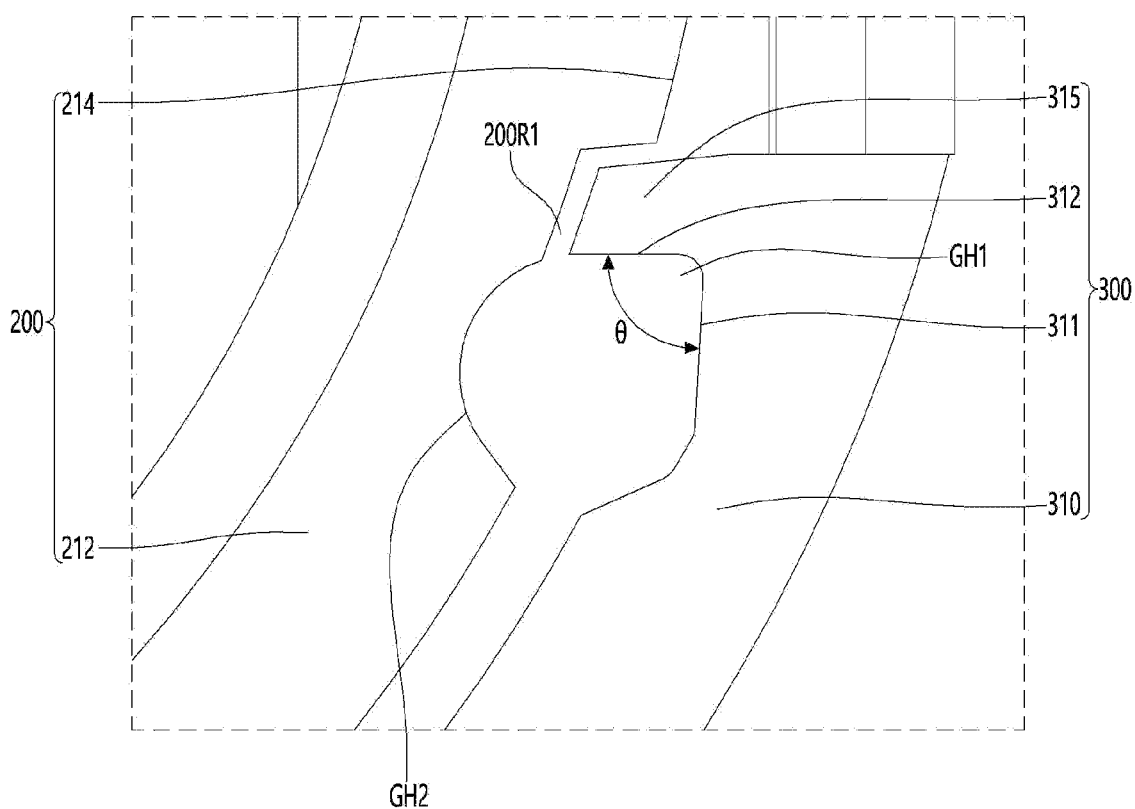

[FIG. 7]
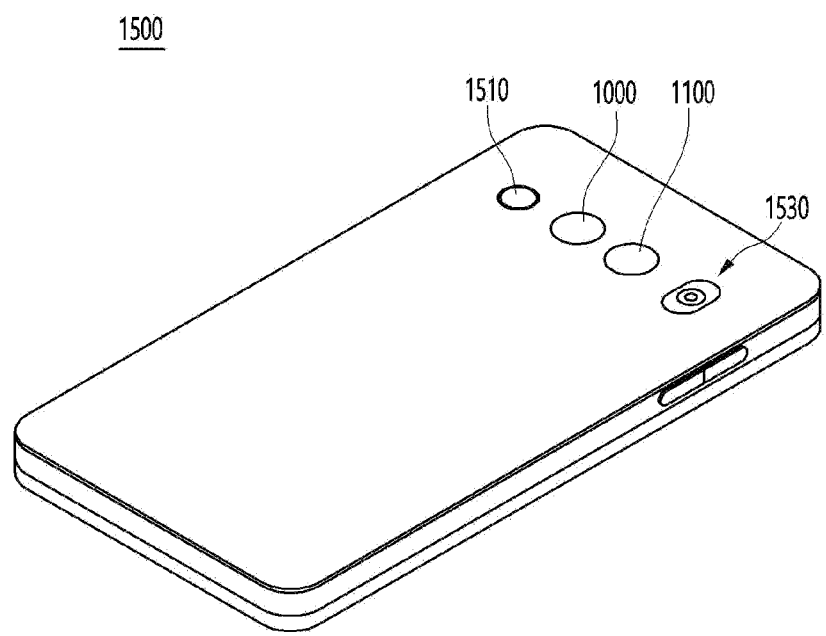

[FIG. 8]
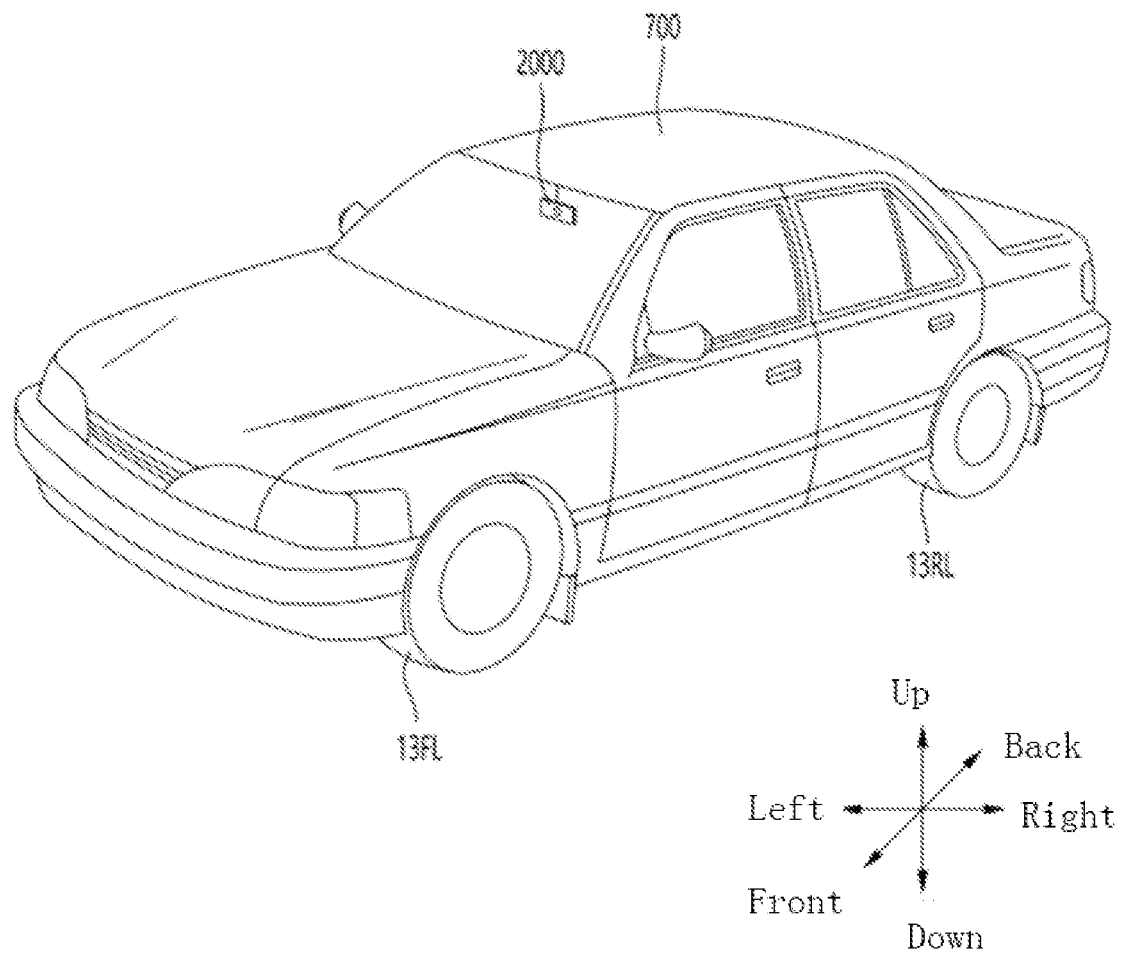

LENS DRIVING DEVICE AND CAMERA MODULE COMPRISING SAME

CROSS-REFERENCE TO RELATED PATENT APPLICATIONS

This application is a U.S. National Stage Application under 35 U.S.C. § 371 of PCT Application No. PCT/KR2022/001638, filed Jan. 28, 2022, which claims priority to Korean Patent Application No. 10-2021-0012961, filed Jan. 29, 2021, whose entire disclosures are hereby incorporated by reference.

TECHNICAL FIELD

The embodiment relates to a lens driving device and a camera module including the same.

The camera module performs a function of capturing a subject and storing it as an image or video, and is used by being mounted on a mobile terminal such as a mobile phone, a laptop computer, a drone, or a vehicle.

On portable devices like smartphones, tablet PCs, and laptops, a miniaturized camera module is integrated. These camera modules can perform autofocus (AF) by automatically adjusting the distance between the image sensor and the lens to align the focal length.

Furthermore, recent camera modules are equipped with zoom lenses to perform zooming functions such as zooming in (zoom up) or zooming out to increase or decrease the magnification of distant subjects.

Moreover, recent camera modules employ image stabilization (IS) technology to compensate for or prevent image shake caused by unstable mounting, user movements, vibrations, or shocks.

Such image stabilization (IS) technology includes an optical image stabilizer (OIS) technology and image sensor-based image stabilization technology.

OIS technology corrects movement by changing the path of light, while image sensor-based image stabilization technology corrects movement mechanically or electronically. OIS technology is more commonly adopted.

Meanwhile, camera modules installed in vehicles are used for driving assistance systems or parking assistance, transmitting images around the vehicle or inside the vehicle to the display.

These vehicle camera modules detect lane markings, vehicles, etc., collect and transmit related data, and enable warnings or vehicle control from the electronic control unit (ECU). However, as the image sensor becomes higher in resolution, the pixel size decreases. Smaller pixels result in a decrease in the amount of light received in the same amount of time. Therefore, the higher the resolution of the camera, the more severe the image shake due to the hand shake that occurs when the shutter speed is slowed down in a dark environment.

Accordingly, the OIS function has recently been indispensably employed in order to capture an image without deformation using a high-pixel camera when shooting in a dark night or shooting a video.

On the other hand, OIS technology is a method of correcting the image quality by moving the lens or image sensor of the camera and correcting the optical path. In particular, OIS technology detects camera movement using a gyroscope sensor and calculates the distance the lens or image sensor needs to move based on this information.

For example, OIS correction methods include a lens shift method and a lens tilt method.

In the case of lens shift method, as the lens moves, the optical axis, which is the reference of the point with the highest spatial resolution value in the image sensor, is repeatedly moved according to the movement of the lens, resulting in severe distortion of the video and even causing a sickness to the user. In addition, the problem of video distortion in such a lens movement method also occurs in a sensor movement method.

In addition, in the case of the related lens tilting method, distortion of the optical axis is repeatedly generated according to the tilting of the lens. When the optical axis is repeatedly distorted, the distance between the lens and the image sensor is changed. As the optical axis, which is a reference for the spatial resolution value, is repeatedly moved, the distortion of the moving image is more severe. The problem of video distortion in the lens tilt method is also a problem in the sensor tilt method.

However, a proper technical solution to the problems mentioned above has not been prepared.

In addition, the OIS technology of the related art requires a mechanical driving device for lens movement, sensor movement, etc., so the structure is complex and there is a limit to implementing a subminiature camera module.

In this applicant's internal technology, a method of moving a module including a lens and an image sensor was studied to solve the above technical problems. The module movement method has a wider correction range than the lens movement method, and since the optical axis of the lens and the axis of the image sensor are not twisted, there is a technical effect that there is no distortion of the image by minimizing the deformation of the image.

The rotation motion for OIS implementation includes a pitch that means rotation motion in an up and down direction with the horizontal coordinate axis of the camera module as a rotation axis. And, the rotational motion includes yaw, which means a rotational motion in a left and right direction with the vertical coordinate axis of the camera module as a rotational axis. Further, the rotational motion includes a roll, which means rotational motion with an optical axis passing in the forward and backward directions of the camera module as a rotational axis.

However, in order to implement the OIS function in the camera module, sensor shift or tilting is required. Furthermore, in order to implement module tilting, a structure of image sensor moving is required.

In the related internal technology, a sensor wiring structure capable of connecting a sensor circuit board to which the image sensor is attached and a power source and a signal for driving the image sensor are required to move the image sensor.

On the other hand, the sensor wiring structure of the internal technology connects electrical signals and at the same time serves as a spring that does not break even if there is movement and maintains the connected state by increasing the length.

However, there are the following problems in relation to the internal technology of the sensor wiring structure. When the size of the image sensor increases to increase the amount of light received or implement a high pixel, the size of the sensor circuit board to which the image sensor is attached increases. In addition, if the length of the sensor wiring structure is increased to increase the amount of light received or to implement a high pixel, the size of the camera module increases.

On the other hand, if the length of the sensor wiring structure is reduced while maintaining the camera module size, the spring stiffness of the sensor wiring structure increases, resulting in a technical contradiction in that more force is required for image sensor shift or tilting driving for OIS driving.

On the other hand, in the implementation of OIS, a larger force is required for rolling torque in the implementation of roll than in the implementation of pitch and yaw.

In the related art, in order to increase the driving force, a method of increasing a magnet size or increasing a current of a coil is adopted, but there is a limit in that the roll is not properly implemented.

In addition, in the related art, a stopper for implementing AF is employed, but a stopper for implementing OIS has a limitation in that it is not properly employed, and thus there is a problem of deteriorating reliability of the camera module when an external impact occurs.

On the other hand, in order to obtain the best optical characteristics by using a plurality of zoom lens groups in a camera module, the alignment between the plurality of lens groups and the alignment between the plurality of lens groups and the image sensor must be well matched. However, when the center of the spherical surface between the lens groups is deviated from the optical axis, the angle of view changes or when the center of the lens group and the image sensor are not aligned, the angle of view changes or defocus occurs. This will adversely affect the image quality or resolution.

On the other hand, in the related art, when an impact is applied to the camera module, a technical problem may occur in which components of the camera module are separated. For example, if a mobile phone equipped with a camera module is dropped or in an environment with severe vibration, such as a vehicle, each component of the camera module, for example, a barrel, housing, magnet, etc., can be detached. It can cause major problems such as mechanical reliability as well as thrust, precision, and control.

On the other hand, as described above, the camera module can be applied to a vehicle along with a radar and used in Advanced Driver Assistance Systems (ADAS). The ADAS can have a great impact on the safety and life of drivers and pedestrians as well as the driver's convenience.

When a camera module is applied to the ADAS of a vehicle, OIS technology becomes more important due to vehicle vibration, and the precision of OIS data can be directly related to the safety or life of drivers or pedestrians.

In addition, when AF or zoom is implemented, a plurality of lens assemblies are driven by electromagnetic force between magnets and coils, but there is a problem in that magnetic field interference occurs between magnets mounted on each lens assembly. Due to magnetic field interference between these magnets, there is a problem in that the AF or zoom operation is not performed properly and the thrust is reduced. In addition, there is a problem of causing decentering or tilting due to magnetic field interference between magnets.

When a problem arises in the precision of camera control due to magnetic field interference, when thrust is reduced, or when a decentralization or tilt phenomenon is induced, the safety of a driver or pedestrian can be at risk.

Meanwhile, in the related camera module technology, the initial position of a lens is controlled by a preload of a spring structure in an existing AF structure. However, such a spring preload structure has technical problems in that it is vulnerable to high-frequency vibration, has high driving resistance due to stiffness by the spring, and generates dynamic tilt.

On the other hand, the contents described in the items simply provide background information and do not constitute prior art.

DISCLOSURE

Technical Problem

One of the technical problems of the embodiment is that when the size of the image sensor increases, the spring stiffness of the sensor wiring structure for shifting and tilting the image sensor for OIS implementation increases. Accordingly, it is intended to provide a lens driving device and a camera module including the same that can solve the technical problem of requiring more force for image sensor shift or tilting driving for OIS driving.

In addition, one of the technical problems of the embodiment is to provide a lens driving device and a camera module including the lens driving device that can solve the problem that a larger force is required for rolling torque in implementing roll compared to implementing pitch and yaw in OIS implementation.

In addition, one of the technical problems of the embodiment is to provide a lens driving device and a camera module including the same capable of solving the problem of deteriorating the reliability of the camera module when an external impact occurs in OIS implementation.

In addition, one of the technical problems of the embodiment is to provide a lens driving device and a camera module including the same capable of solving a technical problem that components of the lens driving device are separated when an impact is applied to the camera module.

In addition, one of the technical problems of the embodiment is to provide a lens driving device and a camera module including the same that can solve the problem of high-frequency vibration due to the spring structure in the AF structure of the camera module, the increase in driving resistance, or the dynamic tilting.

In addition, one of the technical challenges of the embodiment is to provide a lens driving device and a camera module including the same capable of preventing magnetic field interference between magnets when implementing AF or OIS.

The technical problems of the embodiments are not limited to those described in this section, but include those that can be understood from the entire description of the invention.

Technical Solution

A lens driving device according to an embodiment can include a first housing in which a bobbin including a lens is disposed and a magnet is disposed; a second housing disposed to surround the first housing and having a coil disposed thereon; a main substrate disposed below the second housing, a sensor substrate located between the main substrate and the second housing and having an image sensor disposed thereon, and a wiring substrate electrically connecting the main substrate and the sensor substrate.

The wiring substrate can include a first wiring frame electrically connected to the main substrate, a second wiring frame on which the sensor substrate is disposed, and a wiring part electrically connecting the first wiring frame and the second wiring frame.

A first size of the sensor substrate can be larger than a second size of the second wiring frame.

A size of the image sensor can be smaller than the first size of the sensor substrate.

A size of the image sensor can be greater than the second size of the second wiring frame.

The main substrate includes a board through-hole at the center, and a size of the board through-hole may be greater than a size of the second wiring frame.

A size of the board through-hole can be smaller than a size of the first wiring frame.

A size of the board through-hole can be smaller than a size of the sensor substrate.

In addition, a lens driving device according to the other embodiment can include a first housing in which a lens assembly is disposed and a magnet is disposed, a second housing disposed to surround the first housing and having a coil disposed thereon, wherein the first housing can include a protruding part protruding toward the coil at a position corresponding to the coil.

The magnet can be disposed on the protruding portion, and the second housing may overlap the protruding portion in a vertical direction.

An end of the protruding part can have a groove in which the magnet is disposed.

The first housing can include a first surface facing the second housing, the second housing includes a second surface facing the first housing, and the first surface and the first and the second surfaces can include curved surfaces in which a central portion is convex outward that upper and lower portions.

The embodiment can include a second guide member disposed between the first surface and the second surface.

The second housing can include a groove in which the protruding part is disposed.

The magnet can be disposed closer to the coil than to the groove.

The first housing is capable of rotational driving and tilting driving with respect to an optical axis by the first surface, the second surface, and the second guide member, and the rotational driving and the tilting driving can be limited by contacting the protruding part with the second housing.

In addition, the lens driving device according to the embodiment can include a first housing in which a lens assembly is disposed and a magnet is disposed, and a second housing disposed to surround the first housing and having a coil disposed thereon; wherein the first housing can include a protruding part protruding toward the coil at a position corresponding to the coil.

The second housing can include a groove in which the protruding part is disposed, and the groove includes a first surface corresponding to a first side surface of the protruding part, a second surface corresponding to a second side surface of the protruding part, and a third surface corresponding to a lower surface of the protruding part.

According to the embodiment, a predetermined magnet can be mounted on the protruding part of the first housing, and the second housing may overlap the protruding part in a vertical direction.

The first housing can include a first surface facing the second housing, the second housing can include a second surface facing the first housing, and each the first surface and the second surface can include a curved surface in which a central portion is formed to be convex outward than upper and lower portions, and a second guide member can be disposed between the first and the second surface.

In addition, the lens driving device according to the embodiment includes a fixing part; and a moving part that moves relative to the fixing part.

The moving part includes a protruding part, and the fixing part can include a first surface and a second surface in contact with the protruding part to limit rotation of the moving part in a first direction, and a third surface to limit tilting of the moving part in a second direction different from the first direction.

A stopper for limiting rotation of the moving part can be included.

Also, the lens driving device according to the embodiment can include a first housing in which a lens assembly is disposed and a magnet is disposed, and a second housing disposed to surround the first housing and having a coil disposed thereon.

The first housing can include a protruding part protruding toward the coil at a position corresponding to the coil.

The second housing can include a first area contacting the protruding part when the first housing is rotated about an optical axis, and a second area contacting the protruding part when the first housing is tilted.

Also, the lens driving device according to the embodiment can include a first frame on which a lens is disposed, a second frame on which the first frame is disposed, and a third frame on which the second frame is disposed.

The first frame moves in the Z-axis direction, the second frame tilts in the X-axis and Y-axis directions and rotates around the Z-axis, and the third frame can include a stopper structure for limiting tilting and rotation of the second frame.

The stopper structure can include four stopper structures, two in the X-axis direction and two in the Y-axis direction.

The stopper structure can be symmetrically disposed at four corners of the third frame.

In addition, the lens driving device according to the embodiment includes a fixing part and a moving part moving with respect to the fixing part, wherein the moving part includes a protruding part, and the fixing part can include a stopper into which the protruding part is inserted and which restricts rotation of the moving part.

The stopper can be formed by three faces of the groove.

The fixing part can include a receiving part in which the protruding part is disposed.

One surface of the receiving part can include a groove into which the protruding part is inserted.

In one surface of the stopper, a width of an upper region can be greater than a width of a middle region.

One side of the end area of the protruding part can be disposed on one surface of the magnet, and the other side facing the one side can be open.

A camera module according to an embodiment can include any one of the above lens driving devices.

Advantageous Effects

According to the lens driving device and the camera module including the same according to the embodiment, even if the size of the image sensor increases, as the spring stiffness of the sensor wiring structure for image sensor shift and tilt for OIS implementation increases, the technical contradiction that the force required for image sensor shift or tilt drive for OIS drive increases can be solved.

For example, in the embodiment, as the size of the image sensor 60 increases, a first size D1 of a sensor substrate 550 on which an image sensor 60 is mounted may increase. In this embodiment, a second wiring frame 520 electrically connected to the sensor substrate 550 is provided, and a second size D2 of the second wiring frame 520 can be controlled to be smaller than the first size D1 of the sensor substrate 550 and the size of the image sensor 60. And the second wiring frame 520 can be directly connected to a wiring part 530.

Accordingly, even if the size of the image sensor 60 increases, the size of the second wiring frame 520 connected to the wiring part 530 may not increase, so the wiring part 530 directly connected to the second wiring frame 520 can be designed to be long. Accordingly, since the length of the wiring unit 530 can be provided long, the spring rigidity of the wiring unit 530 can be reduced.

In addition, according to the lens driving device and the camera module including the same according to the embodiment, in OIS implementation, it can solve the problem that a larger force is required for rolling torque when implementing roll than when implementing pitch and yaw.

For example, in an embodiment, a second magnet part MN2 for roll implementation may be placed fa farther apart from the center of the lens 100 or the bobbin 200 rather than the second magnet part MN2 for implementing pitch or yaw. Due to this, the embodiment can solve the problem of requiring a larger force for rolling torque.

In addition, for example, according to the embodiment, the second magnet part MN2 disposed at the corner of the second housing 400 and facing the second coil part CL2 has a special technical effect of increasing the driving force by realizing a larger torque by being disposed farther from the center of the lens 100 or the center of the bobbin 200 than the first magnet part MN1 facing the third coil part CL3.

In addition, according to the embodiment, even if the size of the image sensor increases, the rigidity of the wiring part of the image sensor can be controlled so that the driving force for OIS implementation can be prevented from being unnecessarily increased. As the second magnet part MN2 mounted on the protruding part 320 is disposed far from the center of the lens 100 or bobbin 200, the distance of the driving point increases without increasing the magnet size or additional power. There are complex technical effects in which the driving force can be increased and the increased driving force can contribute to OIS driving without being unnecessarily consumed by the rigidity of the wiring part for the image sensor.

In addition, the embodiment can solve the problem of deteriorating the reliability of the camera module when an external shock or the like occurs in OIS implementation.

For example, in the embodiment, the protruding part 320 of the first housing 300 can be located in the housing groove 400R of the second housing 400, and the protruding part 320 of the first housing 300 and the housing groove 400R of the second housing 400 have a technical effect of implementing a stopper function related to a 3-axis OIS. Through this, the embodiment can solve the problem of deteriorating the reliability of the camera module when an external shock or the like occurs.

In addition, the embodiment can solve a technical problem that the components of the lens driving device are separated when an impact is applied to the camera module. For example, according to the embodiment, the first guide groove GH1 can be provided in the first housing 300, and the second guide groove GH2 can be provided in the bobbin 200.

In the embodiment, the first guide member 220 for AF driving of the lens is disposed between the first guide groove GH1 and the second guide groove GH2, and the first guide groove GH1 and the second guide groove GH2 can function as a guide rail. The first guide groove GH1 can have an asymmetrical shape.

For example, the second guide groove GH2 can have a shape corresponding to the outer circumferential surface of the first guide member 220. For example, the second guide groove GH2 can have a curved shape corresponding to the outer circumferential surface of the first guide member 220.

In addition, the first guide groove GH1 can include a first guide surface 311 and a second guide surface 312 that can contact the first guide member 220. The first guide surface 311 and the second guide surface 312 can be flat.

In an embodiment, an angle Θ formed between the first guide surface 311 and the second guide surface 312 can be an acute angle.

According to the embodiment, the first guide groove GH1 in which the first guide member 220 is disposed can have an asymmetrical shape. Therefore, the embodiment can provide a path through which the lens can move with minimal friction while preventing the first guide member 220 from being separated even when an impact or the like occurs.

In addition, in the embodiment, the angle Θ formed by the first guide surface 311 and the second guide surface 312 can be an acute angle, and through this, even if an impact or the like occurs, the first guide member 220 can prevent breakaway.

In addition, the lens driving device and the camera module including the same according to the embodiment can precisely implement AF and OIS for the lens by preventing separation of the first guide member 220 when AF, zooming, or OIS is implemented. That is, it is possible to solve the problem of lens decenter or tilt. Due to this, alignment between the plurality of lens groups is well matched to prevent a change in angle of view or occurrence of out-of-focus, and remarkably improve image quality or resolving power.

In addition, according to the embodiment, it is possible to solve the technical problems of occurrence of high-frequency vibration, increase in driving resistance, and occurrence of dynamic tilt due to a preload spring structure in the AF structure.

For example, according to the embodiment, it is possible to provide a structure for moving a lens with minimal friction and tilt by removing a spring vulnerable to high-frequency vibration from an AF structure and applying a guide shaft. According to the embodiment, the first guide member 220 for AF driving can be disposed between the first guide groove GH1 and the second guide groove GH2. Accordingly, there is no vibration due to high frequency by removing the spring structure compared to the related art, and there is no spring structure, so driving resistance is low and power consumption is reduced, and there is a technical effect of less dynamic tilt (Dynamic tilt) compared to the guide bearing structure.

In addition, according to the embodiment, there is a technical effect of preventing magnetic field interference between magnets when AF or OIS is implemented. For example, in the related internal technology, there is a problem in that thrust is reduced because AF driving or OIS driving does not work properly due to magnetic field interference between a magnet for driving AF and a magnet for driving OIS. In addition, there is a problem of causing decentering or tilting due to magnetic field interference between magnets.

According to the embodiment, there is a technical effect capable of providing a lens driving device capable of preventing magnetic field interference between magnets and a camera module including the same by changing the arrangement positions of the magnets for OIS driving and AF driving.

The technical effects of the embodiments are not limited to those described in this section, but include those that can be understood from the entire description of the invention.

DESCRIPTION OF DRAWINGS

FIG. 1A is a perspective view of a camera module according to an embodiment.

FIG. 1B is a detailed perspective view of the camera module according to the embodiment shown in FIG. 1A.

FIG. 2A is a bottom view of the camera module according to the embodiment shown in FIG. 1B.

FIG. 2B is a perspective view in which a wiring substrate, a sensor substrate, and an image sensor are disposed in a camera module according to the embodiment shown in FIG. 2A;

FIG. 2C is an exploded perspective view of the wiring substrate, sensor substrate, and image sensor shown in FIG. 2B;

FIG. 2D is a bottom view of FIG. 2B;

FIG. 3A is a view in which a main substrate is omitted from the camera module according to the embodiment shown in FIG. 1A;

FIG. 3B is a detailed view in which bobbins, lenses, image sensors, and sensor substrates are omitted in FIG. 3A.

FIG. 3C is a detailed view in which the first housing, the first guide part, and the wiring substrate are omitted in FIG. 3B.

FIG. 3D is an enlarged view of the first region in FIG. 3B.

FIG. 3E is an enlarged view of the second area in FIG. 3C.

FIG. 3F is an enlarged view of the second housing in FIG. 3E;

FIG. 4A is a perspective view of a lens driving device in the camera module according to the embodiment shown in FIG. 3A.

FIG. 4B is a plan view of the lens driving device according to the embodiment shown in FIG. 4A;

FIG. 4C is a cross-sectional view of the lens driving device according to the embodiment shown in FIG. 4B along line A1-A2;

FIG. 5A is a perspective view of a lens driving device according to the embodiment shown in FIG. 3A;

FIG. 5B is a side cross-sectional view of the lens driving device according to the embodiment shown in FIG. 5A taken along line B1-B2 perpendicular to the z-axis.

FIG. 6A is an enlarged view of a third region in a cross-sectional side view of the lens driving device according to the embodiment shown in FIG. 5B;

FIG. 6B is a first detail view of FIG. 6A,

FIG. 6C is a second detail view of FIG. 6A,

FIG. 6D is a third detail view of FIG. 6A.

FIG. 7 is a perspective view of a mobile terminal to which a camera module according to an embodiment is applied;

FIG. 8 is a perspective view of a vehicle to which a camera module according to an embodiment is applied.

MODE FOR INVENTION

Hereinafter, embodiments will be described in detail with reference to the accompanying drawings. Embodiments can apply various changes and can have various forms, and specific embodiments will be illustrated in the drawings and described in detail in the text. However, this is not intended to limit the embodiments to a specific form disclosed, and should be understood to include all modifications, equivalents, or substitutes included in the spirit and technical scope of the embodiments.

Terms such as "first" and "second" can be used to describe various components, but the components should not be limited by the terms. These terms are used for the purpose of distinguishing one component from another. In addition, terms specifically defined in consideration of the configuration and operation of the embodiment are only for describing the embodiment, and do not limit the scope of the embodiment.

In the description of the embodiment, in the case where it is described as being formed on "upper (above)" or "lower (on or under)" of each element, on or under includes both elements formed by directly contacting each other or by indirectly placing one or more other elements between the two elements. In addition, when expressed as "up" or "down (on or under)", it can include the meaning of not only the upward direction but also the downward direction based on one element.

In addition, relational terms such as "on/above/upper" and "below/bottom/lower" used below refer to any relationship between such entities or elements. It may also be used to distinguish one entity or element from another entity or element without necessarily requiring or implying a physical or logical relationship or order.

Embodiment

Hereinafter, specific features of the camera module according to the embodiment will be described in detail with reference to the drawings.

FIG. 1A is a perspective view of a camera module 1000 according to an embodiment, and FIG. 1B is a detailed perspective view of the camera module 1000 according to the embodiment shown in FIG. 1A.

In the direction of the x-y-z axis shown in FIG. 1A, the z axis means the direction of the optic axis or a direction parallel thereto, the x-y plane indicates the ground perpendicular to the z axis, and the x axis is perpendicular to the z axis in the ground (x-y plane) direction, and the y-axis may mean a direction perpendicular to the x-axis on the ground.

The camera module 1000 according to the embodiment can be a module tilting method in which a lens 100 and an image sensor 60 (see FIG. 2B) move integrally to implement OIS. Meanwhile, when the AF is driven, only the lens 100 can be moved in a state in which the image sensor 60 is fixed to change the distance to the image sensor 60, but is not limited thereto.

Referring to FIG. 1A, the camera module 1000 according to an embodiment includes a main substrate 50. The camera module 1000 is disposed on the main substrate 50 and can include a bobbin 200 on which a lens 100 is disposed. The camera module 1000 can include a first housing 300 in which the bobbin 200 is disposed. The camera module 1000 can include a second housing 400 in which the first housing 300 is disposed.

The second housing 400 can be disposed outside the first housing 300 in plurality. For example, the second housing 400 can be provided in four each disposed at a corner outside the first housing 300, but is not limited thereto.

The main substrate 50 can be a PCB, Flexible Printed Circuit Boards (FPCB), or Rigid Flexible Printed Circuit Boards (RFPCB).

Referring next to FIG. 1B, the embodiment can include a plurality of coil substrates 52 electrically connected to the main substrate 50 and disposed in the second housing 400. A second coil part CL2 and a third coil part CL3 can be disposed on the coil substrate 52.

For example, the coil substrates 52 can be disposed on each of the four second housings 400, and the second coil part CL2 and the third coil part CL3 can be disposed on each coil substrate 52, but are not limited thereto.

Also, in the embodiment, a second magnet part MN2 can be disposed in the second housing 400. For example, the second magnet parts MN2 can be respectively disposed in each of the four second housings 400.

According to the embodiment, the OIS can be driven by electromagnetic force between the second magnet part MN2 and the second coil part CL2.

Also, according to the embodiment, a first magnet part MN1 can be disposed in an area of the first housing 300 corresponding to the third coil part CL3 (see FIG. 3C). According to the embodiment, the OIS can be driven by electromagnetic force between the first magnet part MN1 and the third coil part CL3. As will be described later, the first magnet part MN1 may also perform an AF driving function. For example, some of the first magnet parts MN1 may contribute to OIS driving, and other parts of the first magnet parts MN1 may contribute to AF driving.

Next, FIG. 2A is a bottom view of the camera module 1000 according to the embodiment shown in FIG. 1B.

Referring to FIG. 2A, the camera module 1000 according to an embodiment includes the main substrate 50, a wiring substrate 500 disposed on the main substrate 50, and a sensor substrate 550 disposed on the wiring substrate 500.

The wiring substrate 500 can include a first wiring frame 510 electrically connected to the main substrate 50 and a second wiring frame 520 on which the sensor substrate 550 is disposed. The wiring substrate 500 may further include a wiring part 530 electrically connecting the first wiring frame 510 and the second wiring frame 520. The wiring part 530 can be an elastic wiring part. For example, the wiring part 530 can be a spring-type elastic wiring part, but is not limited thereto.

The wiring part 530 can be disposed in a curved shape in the form of a flexible printed circuit board.

The first wiring frame 510 and the second wiring frame 520 can have a polygonal shape. For example, the first wiring frame 510 and the second wiring frame 520 can have a rectangular shape, but are not limited thereto.

The wiring part 530 can be formed in plurality. For example, the wiring part 530 may be formed in two, three, four or more to connect a plurality of sides of the first wiring frame 510 and the second wiring frame 520, respectively, but it is not limited thereto.

The main substrate 50 can have a board through-hole 50H at its center. The size of the board through-hole 50H can be larger than the size of the second wiring frame 520 and can be smaller than the size of the first wiring frame 510. Also, the size of the board through-hole 50H can be smaller than that of the sensor substrate 550.

A part of the lower surface of the sensor substrate 550 can be exposed through the board through-hole 50H, and the second wiring frame 520 can be space-movable through the board through-hole 50H.

In addition, the embodiment can include a gyro sensor (not shown) disposed on the main substrate 50 to sense motion and a driving circuit element (not shown) driven according to input/output signals of the gyro sensor.

The gyro sensor of the embodiment may employ a 2-axis gyro sensor that detects two rotational motion amounts of pitch and yaw, which represent large motions in a two-dimensional image frame. Furthermore, the gyro sensor may employ a 3-axis gyro sensor that detects all movement amounts of pitch, yaw, and roll for more accurate image stabilization. Movements corresponding to pitch, yaw, and roll detected by the gyro sensor can be converted into appropriate physical quantities according to a hand-shake correction method and a correction direction.

Next, FIG. 2B is a perspective view in which the wiring substrate 500, the sensor substrate 550, and the image sensor 60 are disposed in the camera module according to the embodiment shown in FIG. 2A.

For example, FIG. 2B shows perspective view of the wiring substrate 500, the sensor substrate 550 disposed on the wiring substrate 500, and the image sensor 60 disposed on the sensor substrate 550 in the camera module according to the embodiment shown in FIG. 2A.

Also, FIG. 2C is an exploded perspective view of the wiring substrate 500, the sensor substrate 550, and the image sensor 60 shown in FIG. 2B, and FIG. 2D is a bottom view of FIG. 2B.

On the other hand, one of the technical problems of the embodiment is that when the size of the image sensor increases, the spring stiffness of the sensor wiring structure for shifting and tilting the image sensor for OIS implementation increases. Accordingly, it is intended to provide the lens driving device and the camera module including the same that can solve the technical problem of requiring more force for image sensor shift or tilting driving for OIS driving.

Hereinafter, technical features of an embodiment for solving the above technical problem will be described with reference to FIG. 2C.

Referring to FIG. 2C, the camera module 1000 according to the embodiment can include a wiring substrate 500, a sensor substrate 550 disposed on the wiring substrate 500, and an image sensor 60 disposed on the sensor substrate 550.

The wiring substrate 500 can include a first wiring frame 510 electrically connected to the main substrate 50, a second wiring frame 520 on which the sensor substrate 550 is disposed, and a wiring part 530 electrically connecting the first wiring frame 510 and the second wiring frame 520. The wiring part 530 can be a spring-type elastic wiring part, but is not limited thereto.

In an embodiment, a first size D1 of the sensor substrate 550 can be larger than a second size D2 of the second wiring frame 520. Also, a size of the image sensor 60 can be smaller than the first size D1 of the sensor substrate 550 and larger than the second size D2 of the second wiring frame 520.

In the embodiment, the size of each component can be a horizontal length in the first axis direction, but is not limited thereto.

According to the lens driving device and the camera module including the same according to the embodiment, when the size of the image sensor increases, the spring rigidity of the sensor wiring structure for shifting and tilting the image sensor for implement OIS increases. Accordingly, a technical contradiction arises in that more force is required for shifting or tilting the image sensor for OIS driving. Embodiments may provide the lens driving device capable of solving these technical contradictions and the camera module including the same.

For example, in the embodiment, as the size of the image sensor 60 increases, the first size D1 of the sensor substrate 550 on which the image sensor 60 is mounted may increase. At this time, in the embodiment, a second wiring frame 520 electrically connected to the sensor substrate 550 is provided. The second size D2 of the second wiring frame 520 can be controlled to be smaller than the first size D1 of the sensor substrate 550 and the image sensor 60. The second wiring frame 520 may connect directly with wiring part 530.

Accordingly, even if the size of the image sensor 60 increases, a size of the second wiring frame 502 connected with wiring part 530 may not increase, so the wiring part 530 can be designed to be long, and accordingly the length of the wiring part 530 can be provided long, therefore the spring rigidity of the wiring part 530 can be reduced.

Therefore, in the embodiment, even if the size of the image sensor increases, the length of the wiring unit 530 can be secured without increasing the size of the camera module, so the spring stiffness of the sensor wiring structure for shifting and tilting the image sensor for OIS implementation can be controlled to be small.

Next, the OIS driving of the embodiment will be described with reference to FIGS. 3A to 3C. FIG. 3A is a view in which the main substrate 50 is omitted from the camera module according to the embodiment shown in FIG. 1A, and FIG. 3B is a detailed view in which the bobbin 100, the lens 100, the image sensor 60, and the sensor substrate 550 are omitted in FIG. 3A.

Also, FIG. 3C is a detailed view in which the first housing 300, the first guide member 220, and the wiring substrate 500 are omitted in FIG. 3B.

First, referring to FIG. 3A, the camera module 1000 according to the embodiment can include a first housing 300 on which a bobbin 200 is disposed and a second housing 400 on which the first housing 300 is disposed.

Next, referring to FIG. 3B based on FIG. 3A, the embodiment can include a wiring substrate 500 electrically connected to the main substrate 50 and disposed below the second housing 400.

The camera module 1000 according to the embodiment can be a module tilting method in which a lens 100 and an image sensor 60 move integrally to implement OIS.

Through this, the embodiment can operate OIS by moving the entire module including the lens and the image sensor, so the correction range is wider than that of the existing lens movement method. Also, since the optical axis of the lens and the axis of the image sensor are not twisted there is a technical effect without distortion of the image by minimizing the deformation of the image.

Referring to FIG. 3B, the wiring substrate 500 can include a first wiring frame 510 electrically connected to the main substrate 50. The wiring substrate 500 can include a second wiring frame 520 electrically connected to the image sensor 60. The wiring substrate 500 can include a wiring part 530 connecting the first wiring frame 510 and the second wiring frame 520.

The first wiring frame 510 and the second wiring frame 520 can be a rigid printed circuit board (Rigid PCB) but is not limited thereto. The wiring part 530 can be a flexible printed circuit board (Flexible PCB) or a rigid printed circuit board (Rigid Flexible PCB), but is not limited thereto.

The wiring part 530 can be disposed in a curved shape in the form of a flexible printed circuit board.

Next, referring to FIGS. 3B and 3C together, the embodiment can include a plurality of coil substrates 52.

For example, the coil substrates 52 can be disposed on each of the four second housings 400, and the second and third coil units CL2 and CL3 are disposed on each of the coil substrates 52, respectively, but is not limited thereto.

Also, in the embodiment, a second magnet part MN2 can be disposed in the second housing 400. For example, the second magnet parts MN2 can be respectively disposed in each of the four second housings 400.

Referring to FIG. 3B, the second magnet part MN2 can be disposed on the protruding part 320 of the first housing 300. For example, an end of the protruding part 320 of the first housing 300 can have a protruding groove (not shown) in which the second magnet part MN2 is disposed.

According to the embodiment, the OIS can be driven by electromagnetic force between the second magnet part MN2 and the second coil part CL2.

Also, according to the embodiment, a first magnet part MN1 can be disposed in an area of the first housing 300 corresponding to the third coil part CL3. According to the embodiment, the OIS can be driven by electromagnetic force between the first magnet part MN1 and the third coil part CL3.

Specifically, according to the embodiment, a pitch or yaw OIS can be driven by the electromagnetic force between the first magnet part MN1 and the third coil part CL3.

Also, according to the embodiment, a roll OIS can be driven by electromagnetic force between the second magnet part MN2 and the second coil part CL2.

In the OIS drive in the embodiment, the first housing 300 may rotate in pitch or yaw or roll relative to the second housing 400 by a second guide member 420 disposed between the first housing 300 and the second housing 400.

Referring to FIG. 3B, in the embodiment, the outer surface of the first housing 300 and the inner surface of the second housing 400 can include curved surfaces with a central portion convex outward than the upper and lower portions. In the embodiment, OIS implementation can be possible through a curved surface.

For example, referring to FIG. 3C, the inner surface of the second housing 400 can include a curved surface in which the center is convex outward than the top and bottom. A second guide member 420 is disposed, so that the first housing 300 can be rotated in pitch or yaw or roll relative to the second housing by the module rotational movement of the first housing 300.

For example, referring to FIG. 3B, in the embodiment, the first housing 300 includes an outer surface (not shown) of the first housing 300 facing the second housing 400, and the second housing 400 can include an inner surface (not shown) of the second housing facing the first housing 300.

The outer surface of the first housing and the inner surface of the second housing can include curved surfaces in which a central portion is convex outward than upper and lower portions. In the embodiment, OIS implementation can be possible through a curved surface.

Referring also to FIG. 3C, the embodiment can include a second guide member 420 disposed between the outer surface of the first housing and the inner surface of the second housing. In the embodiment, the first guide member 220 and the second guide member 420 can have different shapes. For example, the first guide member 220 can have a cylindrical shape, and the second guide member can have a ball shape. The second guide member can be a bearing, but is not limited thereto.

Also, according to the embodiment, the AF can be driven along the first guide member 200 by mutual electromagnetic force between another part of the first magnet part MN1 and the first coil part CL1 disposed around the bobbin 200.

According to the lens driving device and the camera module including the same according to the embodiment, in OIS implementation, it is possible to solve the fact that a larger force is required for rolling torque than pitch and yaw implementation.

For example, in the embodiment, the second magnet part MN2 for implementing a roll can be disposed farther from the center of the lens 100 or the bobbin 200 than the second magnet part MN2 for implementing pitch or yaw. Due to this, the embodiment can solve the problem that a large force is required for the Rolling Torque.

For example, according to the embodiment, the second magnet part MN2 disposed at the corner of the second housing 400 and facing the second coil part CL2 may be disposed far from the center of the lens 100 or bobbin 200 than the first magnet part MN1 facing the third coil part CL3. Due to this, there is a special technical effect of increasing the driving force through the implement of a larger torque by increasing the distance of the driving point.

For example, the first housing 300 can include a first housing frame 310 having a hollow circular shape for accommodating the bobbin 200. The first housing 300 can include a protruding part 320 extending from the first housing frame 310 toward a corner of the second housing 400.

At this time, the embodiment can include a first magnet part MN1 mounted on the first housing frame 310 and a second magnet part MN2 mounted on an end of the protruding part 320.

According to the embodiment, the first magnet part MN1 can be mounted on a first housing frame 310. In addition, a second magnet part MN2 can be mounted on the protruding part 320 of the first housing 300. Furthermore, the second magnet part MN2 can be disposed farther from the center of the lens 100 or the bobbin 200 than the first magnet part MN1. Accordingly, there is a special technical effect of increasing the driving force by increasing the distance of the driving point without increasing the size of the magnet or increasing additional power.

In addition, as described above, according to the embodiment, even if the size of the image sensor 60 increases, the size of the second wiring frame 520 connected to the wiring part 530 may not increase. Because of this, since the length of the wiring part 530 directly connected to the second wiring frame 520 can be designed to be long, the spring rigidity of the wiring part 530 can be reduced.

Therefore, the embodiment can solve the technical problem of requiring more force for image sensor shift or tilting driving for OIS driving when the size of the image sensor increases, when the spring stiffness of the sensor wiring structure for shifting and tilting the image sensor for OIS implementation increases.

In addition, according to the embodiment, even if the size of the image sensor increases, it is possible to control the rigidity of the wiring part of the image sensor so that the driving force for OIS implementation can be prevented from being unnecessarily increased. Furthermore, since the second magnet part MN2 mounted on the protruding part 320 of the first housing 300 is disposed far from the center of the lens 100 or the bobbin 200, there is no need to increase the size of the magnet or increase the additional power to increase the driving force. This increased driving force is not unnecessarily consumed by the rigidity of the wiring part for the image sensor, and there are complex technical effects that can contribute to OIS driving.

Next, FIG. 3D is an enlarged view of the first area P1 in FIG. 3B, and FIG. 3E is an enlarged view of the second area P2 in FIG. 3C. Also, FIG. 3F is an enlarged view of the second housing 400 in FIG. 3E.

Referring to FIG. 3D, in the OIS drive in the embodiment, the first housing 300 may pitch or yaw or roll rotate relative to the second housing 400 by the second guide member 420 disposed between the first housing 300 and the second housing 400.

For example, in the embodiment, the pitch or yaw OIS can be driven by the electromagnetic force between the first magnet part MN1 and the third coil part CL3.

Also, according to the embodiment, a roll OIS can be driven by electromagnetic force between the second magnet part MN2 and the second coil part CL2.

Accordingly, in the OIS drive in the embodiment, the first housing 300 may pitch or yaw or roll rotate relative to the second housing 400 by the second guide member 420 disposed between the first housing 300 and the second housing 400.

Also, according to the embodiment, AF can be driven along the first guide part 200 by mutual electromagnetic force between another part of the first magnet part MN1 and the first coil part CL1 disposed around the bobbin 200.

In addition, the embodiment can solve the problem of deteriorating the reliability of the camera module when an external shock or the like occurs in OIS implementation.

For example, in the embodiment, the protruding part 320 of the first housing 300 can be located in the housing groove 400R of the second housing 400. Also, in the embodiment the protruding part 320 of the first housing 300 and the protruding part 320 of the first housing 300 and the housing groove 400R of the second housing 400 have a technical effect of implementing a stopper function related to a 3-axis OIS.

Through this, the embodiment can solve the problem of deteriorating the reliability of the camera module when an external shock or the like occurs.

Specifically, referring to FIG. 3E, the housing groove 400R can include a groove sidewall portion 400R1 and a groove bottom portion 400R2.

The groove side wall portion 400R1 may function as a stopper during roll rotation, and the groove bottom portion 400R2 may function as a stopper during yaw or pitch rotation, but is not limited thereto. Also, the groove bottom portion 400R2 may function as a stopper during AF operation.

Also, in the embodiment, the second guide member 420 can be disposed adjacent to the housing groove 400R, which is a stopper structure.

Also, in the embodiment, the second guide member 420 can be disposed symmetrically left and right with respect to the housing groove 400R. Through this, the OIS function can be stably implemented.

Also, in the embodiment, the first guide member 220 can be disposed to overlap the second guide member 420 in the radial direction about the optical axis.

According to the embodiment, the protruding part 320 of the first housing 300 has a technical effect of improving the driving force in implementing the roll OIS through the mounting function of the second magnet part MN2 and a complex technical function that functions as an OIS stopper.

In addition, according to the embodiment, the second housing 400 has a technical effect of functioning as a stopper while accommodating the second coil part CL2 and the like.

Also, according to an embodiment, the second magnet part MN2 can be disposed closer to the second coil part CL2 than to the housing groove 400R.

Next, referring to FIG. 3F, the second housing 400 can include a housing body 410, a guide groove 420G disposed on the housing body 410, and a housing side wall 425 extending and disposed outside the housing body 410. A housing hole 420H can be provided between the housing sidewall 425 and the housing body 410.

A second guide member 420 can be disposed in the guide groove 420G so that OIS can be realized. In addition, the coil substrate 52 and the second coil part CL2 are disposed in the housing hole 420H, so that OIS can be implemented.

According to the embodiment, the protruding part 320 of the first housing 300 can be located in the housing groove 400R of the second housing 400. The protruding part 320 of the first housing 300 and housing groove 400R of the second housing 400 have a technical effect of implementing a stopper function related to a 3-axis OIS. Through this, the embodiment can solve the problem of deteriorating the reliability of the camera module when an external shock or the like occurs.

Next, FIG. 4A is a perspective view of the lens driving device 1010 in the camera module according to the embodiment shown in FIG. 3A.

Referring to FIG. 4A, a lens driving device 1010 according to an embodiment can include a bobbin 200 on which a lens 100 is disposed, a first housing 300 on which the bobbin 200 is disposed, and a first guide member 220 disposed between the first housing 300 and the bobbin 200.

In addition, in the lens driving device 1010 according to the embodiment, the first housing 300 can include a housing frame 310 disposed around the outer circumference of the bobbin 200 and a protruding part 320 extending and protruding from the housing frame 310. The protruding part 320 can be provided in plurality.

For example, the protruding parts 320 may protrude in four directions toward the second housing 400, but are not limited thereto.

In addition, the lens driving device 1010 according to the embodiment includes a first magnet part MN1 disposed on the housing frame 310 and a second magnet part MN2 disposed on the protruding part 320 of the housing frame 310.

In an embodiment, AF driving can be possible by interaction between a part of the first magnet part MN1 and the first coil part CL1. In addition, the OIS can be driven by the interaction between the second magnet part MN2 and the second coil part CL2. In addition, OIS can be driven by an interaction between another part of the first magnet part MN1 and the third coil part CL3.

Next, FIG. 4B is a plan view of the lens driving device 1010 according to the embodiment shown in FIG. 4A, and FIG. 4C is a cross-sectional view taken along the line A1-A2 of the lens driving device 1010 according to the embodiment shown in FIG. 4B.

As shown in FIG. 4C, AF driving is possible by the interaction between the first magnet part MN1 and the first coil part CL1 disposed on the bobbin 200. Also, a lens 100 may move up and down in the direction of the optical axis, and can be controlled the distance to the image sensor 60 according to the movement of the bobbin 200.

In this case, the first magnet part MN1 can include a positively magnetized magnet.

For example, the first magnet unit MN1 can include a first-first magnet MN1$a$ and a first-second magnet MN1$b$. The first-first magnet MN1$a$ can be disposed to face the first coil part CL1.

In the embodiment, AF driving can be possible as long as the vertical width of the first-first magnet MN1$a$, but is not limited thereto. The first-second magnets MN1$b$ may contribute to driving the OIS by interacting with the third coil part CL3.

Also, the first-first magnet MN1$a$ may contribute to driving the OIS by interacting with the third coil part CL3. That is, the first-first magnet MN1$a$ can be a magnet for both AF driving and OIS, but is not limited thereto.

Next, FIG. 5A is a perspective view of the lens driving device 1010 according to the embodiment shown in FIG. 3A, and FIG. 5B is a cross-sectional side view of the lens driving apparatus 1010 according to the embodiment shown in FIG. 5A perpendicularly to the z-axis taken along line B1-B2.

Referring to FIG. 5B, the lens driving device 1010 according to the embodiment can include a bobbin 200 on which the lens 100 is disposed and a first housing 300 on which the bobbin 200 is disposed. Furthermore, the lens driving device 1010 can include a first guide member 220 disposed between the first housing 300 and the bobbin 200.

The first guide member 220 can be disposed in plurality. For example, the first guide member 220 can be provided four disposed between the bobbin 200 and the first housing 300, but is not limited thereto.

The first guide member 220 can have a shaft shape, but is not limited thereto.

Referring to FIG. 5B, the bobbin 200 of the embodiment can include a second recess 200R2 in an area corresponding to the first magnet MN1 disposed on the first housing 300.

According to the embodiment, as the second recess 200R2 is disposed on the bobbin 200, the electromagnetic force between the first magnet MN1 and the first coil part CL1 can be improved. Also, as the weight of the bobbin 200 decreases, the driving force can be improved.

Next, FIG. 6A is an enlarged view of a third area P3 in a side cross-sectional view of the lens driving device 1010 according to the embodiment shown in FIG. 5B, FIG. 6B is a first detailed view of FIG. 6A, and FIG. 6C is a second detail view of FIG. 6A, and FIG. 6D is a third detail view of FIG. 6A.

For example, FIG. 6B is a first detailed view in which the first guide member 220 is omitted from the enlarged view of the third area P3 in the side cross-sectional view of the lens driving device 1010 according to the embodiment shown in FIG. 6A, FIG. 6C is a second detailed view in which the first guide member 220 is omitted from the enlarged view of the third area P3 in the side cross-sectional view of the lens driving device 1010 according to the embodiment shown in FIG. 6A.

First, referring to FIG. 6A, in the embodiment, the first housing 300 can have a first guide groove GH1 in which the first guide member 220 is disposed. The first guide groove GH1 can have an asymmetrical shape.

Also, the bobbin 200 can have a second guide groove GH2 in which the first guide member 220 is disposed. The second guide groove GH2 can have a shape corresponding to the outer circumferential surface of the first guide member 220. For example, the second guide groove GH2 can have a curved shape corresponding to the outer circumferential surface of the first guide member 220.

Specifically, referring to FIG. 6B, the first housing 300 includes a hollow housing frame 310 accommodating the bobbin 200. The first guide groove GH1 can be formed on the side of the first housing frame 310.

The first guide groove GH1 can include a first guide surface 311 and a second guide surface 312 that can contact the first guide member 220. The first guide surface 311 and the second guide surface 312 may be an acute angle Q.

In addition, the first guide groove GH1 can include a first guide surface 311 and a second guide surface 312 that may contact the first guide member 220. The first guide surface 311 and the second guide surface 312 can be flat.

According to the lens driving device and the camera module including the same according to the embodiment, it is possible to solve the technical problem of separation of the lens driving device when an impact is applied to the camera module.

For example, in the embodiment, the first guide member 220 for AF driving of the lens is disposed between the first guide groove GH1 and the second guide groove GH2, and the first guide groove GH1 and the second guide groove GH2 may function as a guide rail.

According to the embodiment, since the first guide groove GH1 in which the first guide member 220 is disposed has an asymmetrical shape, it is possible to prevent the first guide member 220 from being separated even when an impact or the like occurs. Also, there is a technical effect that can provide a movement path through which the lens can move with minimal friction.

In addition, in the embodiment, the angle Θ formed by the first guide surface 311 and the second guide surface 312 can be an acute angle, and through this, even if an impact or the like occurs, there is a technical effect that can prevent separation of the first guide member 220.

Specifically, referring to FIG. 6C, based on a first line L1 extending from the first guide surface 311 in the first guide groove GH1 and a second line L2 extending from the second guide surface 312, the angle Θ formed by the first guide surface 311 and the second guide surface 312 can be an acute angle.

The first line L1 and the second line L2 can be one of tangential lines to the first guide member 220.

According to the embodiment, by controlling the angle formed between the first guide surface 311 and the second guide surface 312 in the first guide groove GH1 of the first housing 300 to an acute angle, the technical problem of separation of the first guide member 220 when an impact is applied to the camera module can be solved.

Next, referring to FIG. 6D, the bobbin 200 can include a bobbin frame 212 in which the second guide groove GH2 is formed and a first recess 200R1 extending inwardly from the outermost periphery 214 of the bobbin frame.

The first housing 300 can include a first guide protruding part 315 protruding from the first housing frame 310 toward the bobbin 200, and the first guide protruding part 315 can be disposed on the first recess 200R1 of the bobbin 200.

The first guide protruding part 315 can be disposed lower than the outermost periphery 214 of the bobbin 200. Through this, separation of the first guide member 220 can be effectively prevented.

For example, the first guide protruding part 315 of the first housing 300 protrudes in the direction of the bobbin 200 and is protruded and disposed on the first recess 200R1 of the bobbin 200, thereby even in impacting circumstances, the first guide member 220 can be firmly positioned in the first guide groove GH1 and the second guide groove GH2 without being separated, and reliability can be improved by preventing the AF module from being separated due to impact.

In addition, according to the embodiment, it is possible to solve the technical problems of occurrence of high-frequency vibration, increase in driving resistance, and occurrence of dynamic tilt due to a preload spring structure in the AF structure.

For example, according to the embodiment, it is possible to provide a structure for moving a lens with minimal friction and tilt by removing a spring vulnerable to high-frequency vibration from an AF structure and applying a guide shaft.

For example, by adopting the first guide member 220 in the form of a guide shaft in the embodiment, it can move up and down in a point contact state with the first housing 300. Also, according to the embodiment, the first guide member 220 for AF driving can be disposed between the first guide groove GH1 and the second guide groove GH2. Accordingly, there is no vibration due to high frequency by removing the spring structure compared to the related art, and since there is no spring structure, driving resistance is reduced and power consumption is lowered. Therefore, there is a technical effect of less dynamic tilt compared to the guide bearing structure.

In addition, according to the embodiment, there is a technical effect of preventing magnetic field interference between magnets when AF or OIS is implemented. For example, in the related internal technology, there is a problem in that thrust is reduced because AF driving or OIS driving does not work properly due to magnetic field interference between a magnet for driving AF and a magnet for driving OIS. In addition, there is a problem of causing decentering or tilting due to magnetic field interference between magnets.

According to the embodiment, according to the embodiment, there is a technical effect of preventing magnetic field interference between magnets by changing the arrangement positions of the second magnet part MN2 for OIS driving and the first magnet part MN1 for AF driving.

INDUSTRIAL APPLICABILITY

Next, FIG. 7 is a mobile terminal 1500 to which a camera module according to an embodiment is applied.

As shown in FIG. 7, the mobile terminal 1500 of the embodiment can include a camera module 1000, a flash module 1530, and an autofocus device 1510 provided on the rear side. The mobile terminal 1500 of the embodiment may further include a second camera module 1100.

The camera module 1000 can include an image capturing function and an auto focus function. For example, the camera module 1000 can include an auto focus function using an image.

The camera module 1000 processes an image frame of a still image or a moving image obtained by an image sensor in a shooting mode or a video call mode. The processed image frame can be displayed on a predetermined display unit and can be stored in a memory. A camera (not shown) may also be disposed on the front surface of the mobile terminal body.

For example, the camera module 1000 can include a first camera module and a second camera module, and the first camera module may implement OIS along with an AF or zoom function.

The flash module 1530 can include a light emitting element emitting light therein. The flash module 1530 can be operated by operating a camera of a mobile terminal or by a user's control.

The autofocus device 1510 can include one of the packages of a surface light emitting laser device as a light emitting unit.

The auto-focus device 1510 can include an auto-focus function using a laser. The auto-focus device 1510 can be mainly used in a condition in which an auto-focus function using an image of the camera module 1000 is degraded, for example, a proximity of 10 m or less or a dark environment. The autofocus device 1510 can include a light emitting unit including a vertical cavity surface emitting laser (VCSEL) semiconductor device and a light receiving unit such as a photodiode that converts light energy into electrical energy.

Next, FIG. 8 is a perspective view of a vehicle 700 to which a camera module according to the embodiment is applied.

For example, FIG. 8 is an external view of a vehicle equipped with a vehicle driving assistance device to which a camera module 1000 according to an embodiment is applied.

Referring to FIG. 8, a vehicle 700 according to the embodiment can include wheels 13FL and 13FR rotating by a power source and a predetermined sensor. The sensor can be the camera sensor 2000, but is not limited thereto.

The camera 2000 can be a camera sensor to which the camera module 1000 according to the embodiment is applied.

The vehicle 700 of the embodiment may obtain image information through the camera sensor 2000 that captures a front image or a surrounding image. And the vehicle 700 of the embodiment may determine a lane identification situation using image information and create a virtual lane when the lane is not identified.

For example, the camera sensor 2000 may obtain a front image by capturing the front of the vehicle 700, and a processor (not shown) may acquire image information by analyzing an object included in the front image.

For example, when objects such as lanes, adjacent vehicles, driving obstacles, and indirect road markings such as median strips, curbs, and roadside trees are captured in the image captured by the camera sensor 2000, the processor may detect these objects and include them in image information.

At this time, the processor may acquire distance information with the object detected through the camera sensor 2000 to further supplement the image information. The image information can be information about an object photographed in an image.

The camera sensor 2000 can include an image sensor and an image processing module. The camera sensor 2000 may process a still image or moving image obtained by an image sensor (eg, CMOS or CCD). The image processing module may process a still image or video obtained through an image sensor, extract necessary information, and transmit the extracted information to a processor.

In this case, the camera sensor 2000 can include a stereo camera to improve object measurement accuracy and further secure information such as a distance between the vehicle 700 and the object, but is not limited thereto.

The vehicle 700 of the embodiment may provide advanced driver assistance systems (ADAS).

For example, Advanced Driver Assistance Systems (ADAS) can include Autonomous Emergency Braking (AEB), which automatically slows down or stops without the driver applying the brakes in the event of a risk of collision. Advanced Driver Assistance Systems (ADAS) can include Lane Keep Assist System (LKAS), which maintains the lane by adjusting the driving direction when departing from the lane. Advanced Driver Assistance Systems (ADAS) can include Advanced Smart Cruise Control (ASCC: Advanced Smart Cruise Control) that automatically maintains the distance to the vehicle in front while driving at a pre-set speed. Advanced Driver Assistance Systems (ADAS) can include Blind-Spot Collision Avoidance Assist System (ABSD: Active Blind Spot Detection) helps to change lanes safely by detecting the risk of collision in the blind spot. Advanced Driver Assistance Systems (ADAS) can include Around View Monitoring System (AVM: Around View Monitor) that visually displays a situation around the vehicle.

In such an advanced driver assistance system (ADAS), the camera module functions as a core component along with radar and the like, and the proportion of the camera module to which it is applied is gradually widening.

For example, in the case of an automatic emergency braking system (AEB), a vehicle front camera sensor and a radar sensor detect a vehicle or pedestrian in front and automatically emergency brake when the driver does not control the vehicle. Alternatively, in the case of a driving steering assistance system (LKAS), a camera sensor can be used to detect whether a driver departs from a lane without operating a turn signal lamp, and automatically steer the steering wheel to maintain the lane. In addition, in the case of the Around View Monitoring System (AVM), the situation around the vehicle can be visually displayed through camera sensors placed on all sides of the vehicle.

Features, structures, effects, etc. described in the embodiments above are included in at least one embodiment, and are not necessarily limited to only one embodiment. Furthermore, the features, structures, and effects illustrated in each embodiment can be combined or modified with respect to other embodiments by those skilled in the art in the field to which the embodiments belong. Therefore, contents related to these combinations and modifications should be construed as being included in the scope of the embodiments.

Although the above has been described centering on the embodiment, this is only an example and does not limit the embodiment, and those skilled in the art in the field to which the embodiment belongs may find various things not exemplified above to the extent that they do not deviate from the essential characteristics of the embodiment. It will be appreciated that variations and applications of branches are possible. For example, each component specifically shown in the embodiment can be modified and implemented. And differences related to these modifications and applications should be construed as being included in the scope of the embodiments set forth in the appended claims.

The invention claimed is:

1. A lens driving device including:
    a first housing in which a bobbin including a lens is disposed and a magnet is disposed;
    a second housing disposed to surround the first housing and having a coil disposed thereon;
    a main substrate disposed below the second housing;
    a sensor substrate located between the main substrate and the second housing and having an image sensor disposed thereon;
    a wiring substrate electrically connecting the main substrate and the sensor substrate;
    a first guide groove provided in the first housing;
    a second guide groove provided in the bobbin; and
    a first guide member provided between the first guide groove and the second guide groove.

2. The lens driving device of claim 1, wherein the wiring substrate comprises:
    a first wiring frame electrically connected to the main substrate;
    a second wiring frame on which the sensor substrate is disposed; and
    a wiring part disposed on the sensor substrate and electrically connecting the first wiring frame and the second wiring frame.

3. The lens driving device of claim 2, wherein a first size of the sensor substrate is larger than a second size of the second wiring frame, and a size of the image sensor is smaller than the first size of the sensor substrate.

4. The lens driving device of claim 2, wherein the main substrate comprises a board through-hole at a center, and a size of the board through-hole is larger than that of the second wiring frame.

5. The lens driving device of claim 4, wherein the size of the board through-hole is smaller than the size of the first wiring frame, and the size of the board through-hole is smaller than the size of the sensor substrate.

6. A camera module comprising the lens driving device of claim 1.

7. The lens driving device of claim 1,
wherein the first housing comprises a protruding part protruding toward the coil at a position corresponding to the coil,
further comprising a housing groove located in the second housing and in which the protruding part is disposed.

8. The lens driving device of claim 1,
wherein the first guide groove has an asymmetrical shape, and
wherein an optical image stabilization is driven by an interaction between the magnet and the coil.

9. The lens driving device of claim 1, wherein the second guide groove has a shape corresponding to an outer circumferential surface of the first guide member.

10. The lens driving device of claim 1, the first guide groove has a first guide surface and a second guide surface contact with the first guide member.

11. The lens driving device of claim 10, wherein an angle formed by the first guide surface and the second guide surface is an acute angle.

12. A lens driving device including:
a first housing in which a lens assembly is disposed and a magnet is disposed; and
a second housing in which a coil is disposed and disposed so as to surround the first housing;
wherein the first housing comprises a protruding part protruding toward the coil at a position corresponding to the coil, the magnet is disposed on the protruding part and the second housing overlaps the protruding part in a vertical direction.

13. The lens driving device of claim 12, wherein the first housing comprises a first surface facing the second housing, the second housing comprises a second surface facing the first housing, and each the first surface and the second surface comprises a curved surface in which a central portion is formed to be more convex outward than an upper portion and a lower portion thereof.

14. The lens driving device of claim 13, further comprising a second guide member disposed between the first surface and the second surface,
wherein the second housing comprises a groove in which the protruding part is disposed, and the magnet is disposed closer to the coil than the groove.

15. The lens driving device of claim 14, wherein the first housing is capable of rotational driving and tigglting driving with respect to an optical axis by the first surface, the second surface, and the second guide member, and the rotational driving and the tilting driving are limited due to the protruding part contacting the second housing.

16. The lens driving device of claim 12, further comprising a housing groove locating in the second housing and in which the protruding part is disposed.

17. The lens driving device of claim 12, further comprising:
a first guide groove provided in the first housing;
a second guide groove provided in the bobbin; and
a first guide member provided between the first guide groove and the second guide groove.

18. The lens driving device of claim 17, wherein the first guide groove has an asymmetrical shape.

19. The lens driving device of claim 17, wherein the second guide groove has a shape corresponding to an outer circumferential surface of the first guide member.

20. A lens driving device including:
a first housing in which a bobbin including a lens is disposed and a magnet is disposed;
a second housing disposed to surround the first housing and having a coil disposed thereon;
a main substrate disposed below the second housing;
a sensor substrate located between the main substrate and the second housing and having an image sensor disposed thereon;
a wiring substrate electrically connecting the main substrate and the sensor substrate; and
a guide member provided between the first housing and the bobbin,
wherein the bobbin includes a region to receive a portion of the guide member and that has a shape corresponding to an outer circumferential surface of the guide member.

\* \* \* \* \*